US010844224B2

(12) United States Patent
Tisserat

(10) Patent No.: US 10,844,224 B2
(45) Date of Patent: Nov. 24, 2020

(54) BIO-BASED COMPOSITES, COMPOSITE MATERIALS, AND ADHESIVES

(71) Applicant: The United States of America, as represented by the Secretary of Agriculture, Washington, DC (US)

(72) Inventor: Brent Tisserat, Washington, IL (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 189 days.

(21) Appl. No.: 15/651,149

(22) Filed: Jul. 17, 2017

(65) Prior Publication Data

US 2019/0016895 A1    Jan. 17, 2019

(51) Int. Cl.
| | | |
|---|---|---|
| *C08L 97/02* | (2006.01) | |
| *C08L 97/00* | (2006.01) | |
| *C08L 101/16* | (2006.01) | |
| *C08L 91/00* | (2006.01) | |
| *B29K 105/16* | (2006.01) | |

(52) U.S. Cl.
CPC .............. *C08L 97/02* (2013.01); *C08L 91/00* (2013.01); *C08L 97/005* (2013.01); *C08L 101/16* (2013.01); *B29K 2105/16* (2013.01); *C08L 2201/06* (2013.01)

(58) Field of Classification Search
None
See application file for complete search history.

(56) References Cited

U.S. PATENT DOCUMENTS

| | | | | | |
|---|---|---|---|---|---|
| 6,105,321 | A * | 8/2000 | KarisAllen | ............. | E04C 3/122 |
| | | | | | 428/114 |
| 6,941,720 | B2 * | 9/2005 | DeFord | ..................... | E04C 2/04 |
| | | | | | 52/783.14 |
| 7,258,761 | B2 * | 8/2007 | Liu | .......................... | B27N 3/04 |
| | | | | | 156/296 |
| 8,748,516 | B2 * | 6/2014 | Winterowd | ........ | C08G 18/6492 |
| | | | | | 208/24 |
| 9,168,573 | B2 * | 10/2015 | Hojaji | ...................... | C09D 7/61 |

(Continued)

FOREIGN PATENT DOCUMENTS

| | | | |
|---|---|---|---|
| CN | 106869450 | * | 6/2017 |
| GB | 357949 | * | 9/1931 |

OTHER PUBLICATIONS

CN 106869450 Abstract, Jun. 20, 2017 (Year: 2017).*

(Continued)

*Primary Examiner* — Patricia L. Hailey
*Assistant Examiner* — Colette B Nguyen
(74) *Attorney, Agent, or Firm* — John Fado; Maria Restrepo-Hartwig

(57) ABSTRACT

A method for producing an engineered wood material may include a matrix material and filler material. In some embodiments, a separate binder and/or adhesive is not required. The matrix and filler materials may be bio-based and/or renewable materials. The engineered wood material may be produced by compressing the mixed components together under pressure at an elevated temperature for a predetermined amount of time. An advantage of the present invention may be that such materials are easily and cheaply replenished, as opposed to non-bio-based materials which include petroleum-based or other non-renewable products in their manufacture.

20 Claims, 7 Drawing Sheets

(56) References Cited

U.S. PATENT DOCUMENTS

| | | | |
|---|---|---|---|
| 9,908,313 B2* | 3/2018 | Renneckar | B27D 1/00 |
| 10,086,531 B2* | 10/2018 | Clausi | B27N 3/002 |
| 2006/0022372 A1* | 2/2006 | Matuana | B27N 1/003 264/109 |
| 2009/0081468 A1* | 3/2009 | Mortensen | B32B 21/14 428/423.3 |
| 2013/0288318 A1* | 10/2013 | Wood | C11B 1/10 435/135 |
| 2014/0087122 A1* | 3/2014 | Combs | C08B 7/00 428/106 |
| 2015/0258760 A1* | 9/2015 | Renneckar | B27D 1/00 156/272.8 |
| 2016/0264781 A1* | 9/2016 | Via | C08L 97/02 |

OTHER PUBLICATIONS

CN 106869450 Translation, Jun. 20, 2017 (Year: 2017).*
Opinion of Scientific Panel on Contaminants in the Food Chain, EFSA, (2008), European Food Safety Authority, pp. 590:1-76.
Wikipedia.com, Engineered wood. Wikipedia, the free encyclopedia (date accessed:Jun. 26 June.
FAO.org, 2002, Towards sustainable forestry. World Agriculture: Towards 2015/2030 Summary Report.
Ali, Imtiaz et al. "Effects of resin and moisture content on the properties of mediumdensity fibreboards made from kenaf bast fibres",Industrial Crops and Products, (2014), 52:191-198.
Clarizio, S.C. et al.; "Tensile Strength, Elongation, Hardness, and Tensile and Flexural Moduli of Injection-Molded TPS Filled with Glycerol-Plasticized DDGS", J Polym Environ, (2013), 21:623-630.
ClassAction.org, "Lumber Liquidators Class Action Lawsuit Investigation Over Formaldehyde Levels", (2015).
Consumer Product Safety Comission (CPSC), "An Update on Formaldehyde", (2013) Revision 012013.
Elias, Pipa et al., Planting for the Future: "How Demand for Wood Products Could Be Friendly to Tropical Forests", Union of Concerned Scientist, (2014), 40 pages.
Elling, J., Demand for EWP products to growth through 2020. (2015) LBM Journal.
Hojill, Angelista et al., "Adhesive Qualities of Soybean Protein-Based Foamed Plywood Glues", JAOCS, 79(11) :1145-1149.
Kelly, T.J. et al., "Indoor Emissions of Formaldehyde and Toluene Diisocyante". California Environmental Protection Agency-air Resources Board. Research Note 97-9: Topic = Indoor emissions, formaldehyde, toluene. Brief reports to the Scientific and Technical Community, (1997).
Li, Congcong et al., "Preparation of Reinforced Soy Protein Adhesive Using Silane Coupling Agent as an Enhancer", BioResources, (2014) 9(3): 5448-5460.
McVay, K.A. et al, "Camelina Production in Montana", Montana State University Extension MontGuide MT200701AG Revised (Mar. 2008), D-16, 8 p.
Mo, Xiaoqun et al., "Physical properties of medium-density wheat straw particleboard using different adhesives", Industrial Crops and Products, (2003), 18: 47-53.
Mohanty, A.K., "Sustainable Bio-Composites from Renewable Resources:Opportunities and Challenges in the Green Materials World", (2002), Journal of Polymers and the Environment, 10:1/2.
Moser, Bryan R. et al., "Preparation of Fatty Acid Methyl Esters from Osage Orange (*Maclura pomifera*) Oil and Evaluation as Biodiesel",Enengy Fuels, (2011), 25:1869-1877.
Pervaiz, Muhammad et al., "Protein Extraction From Secondary Sludge of Paper Mill Wastewater and its Utilization as a Wood Adhesive", Bioresources, (2011), 6(2):961-970.
Hojilla-Evangelista, Preparation of Fatty Acid Methyl Esters from Osage Orange(*Maclura pomifera*) Oil and Evaluation as Biodiesel, JAOCS, (2002), 79:11.
Rathke, Jorn et al., "Effects of Alternative Raw Materials and Varying Resin Content on Mechanical and Fracture Mechanical Properties of Particle Board, Design of particleboards," BioResources, (2012), BioResources, 7(3): 2970-2985.
Shukla, Rishi et al., "Zein: the industrial protein from corn", Industrial Crops, (20013), 132:171-192.
Smith, Jeffrey L. et al;, Osaga Orange (*Maclura pomifera*): History and Economic Uses, Economic Botany, (1981), 35(1):24-41.
US Environmental Protection AgencyA IRA, Toxicicological review of formaldehyde inhalation toxicity (External Review Draft): In support of summary information on the Integrated Risk Information( System (IRIS), EPA/635/R-10/002A; (2 010).
Zhong, Zhikl et al., "Adhesion Properties of Soy Protein with Fiber Cardboard", JAOCS, 78, No. 1.
Harry-Okuru, Rogers et al., "Osaga Orange (*Maculura pom* L.)—Seed Oil Pola(a-hydroxydibutylamine) triglycerides: synthesis and characterization",J. Agric. Food Chem, (63(29):6588-6595.
Frihart et al., Soy Proteins as Wood Adhesives, chapter 16 from Recent Adv. in Adhesion Sci. & Technol. in Honor of Dr. Kash Mittal, CRC Press Year: 2014.

* cited by examiner

BIO-BASED COMPOSITES, COMPOSITE MATERIALS, AND ADHESIVES

BACKGROUND

Annual per capita wood consumption in both developed and developing countries is about 0.5 m³ per person (FAO.org, 2002. Towards sustainable forestry. World Agriculture: Towards 2015/2030 Summary Report). Almost 80% of wood consumption in developed countries is in the form of industrial or engineered wood products, while in the developing countries about 80% of the wood is burnt as fuels (FAO.org, 2002). It is estimated that by 2030 global consumption of industrial as well as solid wood will rise by 60% over current levels and in addition there will be substantial demand for more paper and paperboard products. The demand for wood products is predicted to increase through 2060. This demand will put continued pressure of the Earth's forests which are already in serious decline (Elias and Boucher, 2014. Planting for the future. Union of Concerned Scientists). From 2000 to 2005 alone 20% of the tropical forest has undergone degradation due to logging (Elias and Boucher, 2014). In 2010, 13 million ha of tropical forests were cut down and a total of 3.4 billion cubic meters of wood were harvested globally. This wood was utilized equally as either fuelwood or sawnwood. Fast growing wood plantations could be the source of engineered wood products (i.e., wood-based panels) veneer/plywood, particle board, fiber board and wood pulp (Elias and Boucher, 2014). Still, for wood demand to be meet in 2060 it would take an additional 59 million ha planted to meet the 178 million m³ increase in demand for wood-based panels: 19 million ha to for the 57 million m³ increase in demand for veneer/plywood, 23 million ha to meet the 70 million m³ increase in demand for particleboard, 17 million ha to meet the 50 million m³ increase in demand for fiberboard, and 7 million ha to meet the 34 million metric ton increase in demand for wood pulp, for a total of 125 million ha (Elias and Boucher, 2014).

To satisfy wood needs, engineered wood products are employed such as fiberboard (FB), which includes particleboard (PB), medium density fiberboard (MDF), hardboard (HB), and oriented strand board (OSB) (Wikipedia.com, 2016. Engineered wood. Wikipedia, the free encyclopedia). These products are made of cellulosic particles of various sizes bonded together with synthetic resin or binder under heat and pressure. Engineered wood products are expected to grow 25 to 33% by 2020 (Elling, 2016. Demand for EWP products to growth through 2020. LBM Journal, 2015.). Currently structural panels made in North America are expected to increase 21% by 2020 from 31.5 billion square feet to 38 billion, largely in response to increased housing starts to 1.5 million units by the end of the decade. Clearly, alternative sources of cellulose sources are needed for tomorrow's fibers. It is noteworthy to recognize that engineered wood products can readily employ non-traditional cellulosic fiber sources (Ali et al., 2014. Effects of resin and moisture content on the properties of medium density fibreboards made from Kenaf bast fibers. Ind. Crops Prod. 52: 192-198; Rathke et al., 2012. Effects of alternative raw materials and varying resin content on mechanical and fracture mechanical properties of particle board. BioResources 7(3): 2970-2985). Aside from the need for lignocellulosic sources to construct engineered wood products, adhesives are also required.

Currently, engineered wood products use petroleum-based resin types such as urea formaldehyde (UF), phenol formaldehyde (PF), melamine fortified urea formaldehyde (MUF), or isocyanate (PMDI) (Wikipedia, 2016). The resins used to create engineered wood products have risen environmental and health questions regarding emission of volatile organic compounds (VOCs) such as formaldehyde (Wikipedia.com, 2016). Formaldehyde emitting resins are now considered to be too toxic to be employed in residential homes. To address this problem isocyanate resins (e.g., PMDI) is substituted and is considered relatively hazard-free. Newer engineered wood products employ isocyanate resins since they do not contain formaldehyde and are considered non-volatile when cured. In addition, UF resins are now considered to be too toxic to be employed in residential homes. To address this problem PF is substituted and is considered relatively hazard-free. Newer engineered wood products employ isocyanate resins since they do not contain formaldehyde and are considered non-volatile when cured. Borate compounds are often used to treat wood to prevent termites, wood boring beetles, molds and fungi (Wikipedia.com, 2016). Lignocellulosic materials other than wood have also been commercially marketed that features wheat straw bonded by a PMDI adhesive and hot pressed to make an "oriented structural" straw board. Nevertheless, engineered wood products are a major source of formaldehyde off-gassing in US homes and present a serious health problem (CPSC, 2013. An update on formaldehyde. U.S. Consumer Product Safety Commission. Publication 725. 2013 Revision 012013). Formaldehyde is classified as a carcinogen and its exposure levels are regulated in the USA to avoid health problems (CPSC, 2013; U.S. Environmental Protection Agency, 2010. Toxicological review of formaldehyde inhalation toxicity (External Review Draft): In support of summary information on the Integrated Risk Information System (IRIS). EPA/635/R-10/002A; ClassAction.org, 2015. Lumber liquidators class action lawsuit investigation over formaldehyde levels. ClassAction.org; Kelly, 1999. Indoor emissions of formaldehyde and toluene diisocyante. California Environmental Protection Agency-Air Resources Board. Research Note 97-9: Topic=Indoor emissions, formaldehyde, toluene). However, wood composite flooring made in China and exported to the US has been shown to have formaldehyde emission levels that exceed current US safety emission standards, in some cases by 350% (ClassAction.org, 2015). Polyurethanes are common as adhesives, coatings and foams. However, polyurethanes (PU) cannot easily be degraded. To address the environmental impact issue, Uniboard (Uniboard Canada Inc., Laval, Quebec, Canada) markets a "Nu Green SOYA" particle board utilizes a soy based adhesive which has low-formaldehyde emissions.

Soy protein-based adhesives derived from soya bean meal have been employed to some extent over the last 80 years (Zhong et al., 2001. Adhesion properties of soy protein with fiber cardboard. JAOCS 78(1): 37-41, doi: 10.1007/s11746-001-0216-0). Soybean proteins (SP) have been considered as an alternative to petroleum polymers because of its abundance, renewability, biodegradability and feasibility (Mo et al., 2003. Physical properties of medium-density wheat straw particleboard using different adhesives. Ind. Crops Prod. 18:47-53. Mohanty et al., 2002. Sustainable bio-composites from renewable resources: opportunities and challenges in the green materials world. J. Polymers Environment 10 (1/2): 19-26, doi: 10.1023/A:1021013921916). Soybean meal originally was recognized as being inexpensive, abundant, and easy to handle since it could be cold or hot pressed (Zhong et al., 2001). However, they were essentially replaced in the 1960s by synthetic adhesives. In recent years, interest in their use was renewed as adhesives because they were biodegradable and free of volatile organic compounds (VOCs). Soya protein isolate (SPI) is recognized as having high adhesion strength but costs considerably more than PF and UF (Zhong et al., 2001). Commercial products such as soya protein isolate (SPI/Pro-Fam 970) (ADM, Decatur, Ill.) that contains 90% protein (dry basis) and defatted soybean flour (SF) that has 50% protein (Cargill, Cedar Rapids, Iowa) are available. Other sources of bio-based adhesives are also being developed; however, none are as of yet sufficiently cheap and readily abundant to cover the substantial market of engineered wood adhesives and composites. There is a great need to develop less expensive, abundant bio-based adhesives to be employed in the manufacture of engineered wood products.

Dried Distillers Grains and Solubles (DDGS) are generated from processed cereal seed residues left over after the distillation of alcohol using the dry milling process (Shukla and Cheryan, 2001. Zein: the industrial protein from corn. Ind. Crop Prod. 13(3):171-192, doi: 10.1016/S0926-6690 (00)00064-9). Approximately, 38-42 million metric tons of DDGSs are produced annually in North America (Clarizio and Tatara, 2013. Tensile strength, elongation, hardness, and tensile and flexural moduli of injection-molded TPS filled with glycerol-plasticized DDGS. J. Polym. Environ. 21: 623-630, doi: 10.1007/s10924-013-0607-x). DDGS is a relatively low value by-product and is mainly used as an animal feed selling for about $0.03-$0.05/lb ($0.06-$0.10/kg).

There are numerous pioneering tree species common to the Midwest region of the USA, these include black mulberry (*Morus nigra* L., family Moraceae), Osage orange (*Maclura pomifera* (Raf.) Schneid., family Moraceae) and black locust (*Robinia pseudoacacia* L., family Fabaceae). These trees are deciduous, fast-growing and readily flower to produce abundant fruits and seeds within a few years after planting. Currently, there is no commercial use for these trees. All three of these trees could be utilized as industrial crops. These three trees have certain advantages over food crops because they do not require intensive applications of fertilizers and pesticides, do not need to re-seed since they readily coppice, and do not require intensive irrigation and application of traditional farming methods such as tilling. Their seed oils may have biofuel and lubrication uses (Harry-O'Kuru et al., 2015. Osage orange (*Maculura pomifera* L.) seed oil poly($\alpha$-hydroxydibutylamine) triglycerides: synthesis and characterization. J. Agric. Food Chem. 63(29): 6588-6595, doi: 10.102$^1$/acs.jafc.5b01625; Moser et al., 2011. Preparation of fatty acid methyl ester from Osage orange (*Maclura pomifera*) oil and evaluation as biodiesel. Energy Fuels 25: 1869-1877, doi: 10.1021/ef200195v). In addition, their seed meal could have non-dietetic utilizations. Previous investigators have noted that tree seed meal has adhesive properties (Smith and Perino, 1981. Orange orange (*Maclura pomifera*): history and economic uses. Econ. Bot. 35(1): 24-31). However, no formal studies have been expended to examine tree seed meals for their adhesive properties.

A promising emerging "new" oil energy-crop that is grown in Central and Plains states of US is Camelina (*Camelina sativa* (L.) Crantz, family Brassicaceae). Camilina seed crops contain higher oil compositions than the current oil seeds crops such as soybeans. Two other crops, lesquerella (*Lesquerella fendleri* A. Gary (S. Watson)) and pennycress (*Thlaspi arvense* L.) are also members of the family Brassicaceae and have been extensively studied as potential oil seed crops. Over half of an oil seed's biomass harvest becomes press cake after the oil pressing extraction process. Press cakes (such as Camelina press cake, or CAM) are often employed as animal feeds and fertilizers, if applicable. However, because the crops are members of the mustard family, Brassicaceae, the press cakes contain glucosinolates which are considered anti-nutritional, and have been widely reported to cause health problems in animals when they consumed them at high levels (McVay, 2008. Camelina Production in Montana. Montana State University Extension, MontGuide MT200701AG Revised March 2008. D-16, 8 p; Opinion of the Scientific Panel on Contaminants in the Food Chain, 2008. EFSA J., 590, 1-76). As a result, other means to utilize CAM are needed in order to maximize profits from growing this crop.

All of the references cited herein, including U.S. patents and U.S. patent application Publications, are incorporated by reference in their entirety.

Mention of trade names or commercial products in this publication is solely for the purpose of providing specific information and does not imply recommendation or endorsement by the U.S. Department of Agriculture.

SUMMARY

According to at least one exemplary aspect of the invention, an engineered wood material may include a matrix material and a filler material, wherein the matrix material is a bio-based material and the filler material is a bio-based material.

According to a further exemplary aspect of the invention, the matrix material may be present in an amount of about 10% to about 95% of the engineered wood material by weight and the filler material may be present in an amount of about 5% to about 90% of the engineered wood material by weight.

According to a further exemplary aspect of the invention, the matrix material may be present in an amount of about 50% to about 75% of the engineered wood material by weight and the filler material may be present in an amount of about 25% to about 50% of the engineered wood material by weight.

According to a further exemplary aspect of the invention, the matrix material may have a protein content of about 10 to about 75%, a lignocellulose content of about 25 to about 90%, an oil content of about 0 to about 10%, and/or a moisture content of about 3 to about 10%.

According to a further exemplary aspect of the invention, the matrix material may be at least one of dried distillers grains and solubles, a soybean flour, a soy protein isolate, a seed press cake, and a ground seed material.

According to a further exemplary aspect of the invention, the matrix material may be at least one of a seed press cake and a ground seed material, and the one of a seed press cake and a ground seed material is produced from the seed of a plant, the plant being a member of one of the families of Moraceae, Fabaceae, and Brassicaceae.

According to a further exemplary aspect of the invention, the plant may be one of black mulberry, Osage orange, black locust, camelina, pennycress, and lesquerella.

According to a further exemplary aspect of the invention, the filler material may be a wood product.

According to a further exemplary aspect of the invention, the wood product may be wood particles.

According to a further exemplary aspect of the invention, the wood product may be produced from at least one of paulownia wood, aspen wood, pine wood, basswood, and Osage orange wood.

According to a further exemplary aspect of the invention, the engineered wood material may consist essentially of the matrix material and the filler material.

According to another exemplary aspect of the invention, a solidified matrix material may consist essentially of a matrix material, and the matrix material is at least one of dried distillers grains and solubles, a seed press cake, and a ground seed material.

According to another exemplary aspect of the invention, a method of producing an engineered wood material may include mixing a matrix material with a filler material to create a composite mixture, adding the composite mixture to a mold, and subjecting the composite mixture simultaneously to an elevated temperature and an elevated pressure for a predetermined amount of time.

According to a further exemplary aspect of the invention, the elevated temperature may be at least 130° C.

According to a further exemplary aspect of the invention, the elevated temperature may be at least 170° C.

According to a further exemplary aspect of the invention, the elevated temperature may be in the range of about 130° to about 210° C.

According to a further exemplary aspect of the invention, the elevated temperature may be in the range of about 150° to about 190° C.

According to a further exemplary aspect of the invention, the elevated pressure may be at least 2 MPa.

According to a further exemplary aspect of the invention, the elevated pressure may be at least 5 MPa.

According to a further exemplary aspect of the invention, the elevated pressure may be in the range of about 2 MPa to about 6 MPa.

According to a further exemplary aspect of the invention, the elevated pressure may be in the range of about 4 MPa to about 6 MPa.

According to a further exemplary aspect of the invention, the predetermined time may be at least 5 minutes.

According to a further exemplary aspect of the invention, the predetermined time may be in the range of about 4 to about 15 minutes.

According to a further exemplary aspect of the invention, the predetermined time may be in the range of about 10 to about 15 minutes.

According to a further exemplary aspect of the invention, the method may also include, prior to subjecting the composite mixture simultaneously to an elevated temperature and an elevated pressure for a predetermined amount of time, subjecting the composite mixture to a an elevated pressure without subjecting said composite mixture to an elevated temperature.

According to a further exemplary embodiment of the invention, the method may also include, after subjecting the composite mixture simultaneously to an elevated temperature and an elevated pressure for a predetermined amount of time, subjecting the composite mixture to the elevated pressure while simultaneously cooling the composite mixture to a range of about 20° C. to about 30° C.

According to a further exemplary aspect of the invention, the subjecting the composite mixture simultaneously to an elevated temperature and an elevated pressure for a predetermined amount of time may be accomplished by subjecting the composite mixture to an elevated temperature and pressure over a plurality of instances, and the predetermined amount of time may be the total time that the composite mixture is subjected to an elevated temperature and pressure over all of the plurality of instances.

According to another exemplary aspect of the invention, an engineered wood material may be produced by a method including mixing a matrix material with a filler material to create a composite mixture, adding the composite mixture to a mold, and subjecting the composite mixture simultaneously to an elevated temperature and an elevated pressure for a predetermined amount of time, wherein the matrix material is a bio-based material, the filler material is a bio-based material, and the matrix material is at least one of dried distillers grains and solubles, a seed press cake, and a ground seed material.

BRIEF DESCRIPTION OF THE FIGURES

Advantages of embodiments of the present invention will be apparent from the following detailed description of the exemplary embodiments. The following detailed description should be considered in conjunction with the accompanying figures in which.

Exemplary

Exemplary

Exemplary

Exemplary

Exemplary

Exemplary

Exemplary

DETAILED DESCRIPTION

Figure 1:
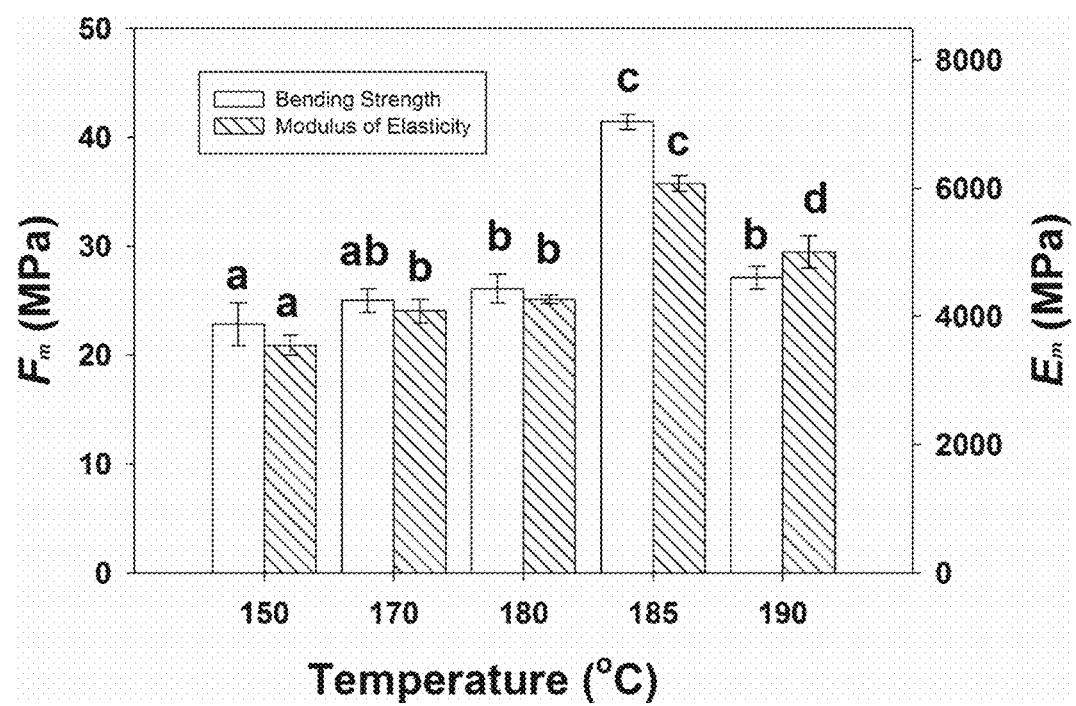
FIG. 1 shows the effect of press temperature on the flexural properties of composite panels according to the present invention.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Unless defined otherwise, all technical and scientific terms used herein have the same meaning as commonly understood by one of ordinary skill in the art to which the invention belongs. As used herein, the term "about" refers to a quantity, level, value, or amount that varies by as much as 20%, preferably by as much as 10%, and more preferably by as much as 5% to a reference quantity, level, value, or amount. Although any methods and materials similar or equivalent to those described herein can be used in the practice or testing of the present invention, the preferred methods and materials are now described.

Other compounds may be added to the composition provided they do not substantially interfere with the intended activity and efficacy of the composition; whether or not a compound interferes with activity and/or efficacy can be determined, for example, by the procedures utilized below. Examples of other compounds may include coloring agents or other aesthetic agents. However, the present invention specifically envisions that a separate binder is not added to the composition, because the matrix material may also concurrently serve as the necessary binder.

The amounts, percentages, and ranges disclosed herein are not meant to be limiting, and increments between the recited amounts, percentages, and ranges are specifically envisioned as part of the invention.

"Optional" or "optionally" means that the subsequently described event or circumstance may or may not occur, and that the description includes instances in which said event or circumstance occurs and instances where it does not. For example, the phrase "optionally comprising X" means that the composition may or may not contain X, and that this description includes compositions that contain and do not contain X.

The term "consisting essentially of" excludes additional method (or process) steps or composition components that substantially interfere with the intended activity of the method (or process) or intended properties of the composition, and can be readily determined by those skilled in the art, for example from a consideration of this specification or practice of the invention disclosed herein.

The invention disclosed herein suitably may be practiced in the absence of any element (e.g. method (or process) steps or composition components) which is not specifically disclosed herein.

The terms "engineered wood," "engineered wood material," "lignocellulosic material," and "composite material" all refer to man-made composite materials including at least a wood-based filler material and matrix material. Such materials are all manufactured by binding or fixing the strands, particles, fibers, or veneers or boards of wood, together with adhesives, or other methods of fixation to form composite materials. Examples of engineered wood materials include, but are not limited to, plywood, fiberboard, particleboard, and laminated timber.

The terms "bio-based material" or "renewable material" refers to a material which is derived directly or indirectly from a plant, tree, or other renewable resource. Examples of bio-based materials include, but are not limited to, wood and wood products, seeds and seed products, including seed flour, natural resins and gums, and biomass materials.

According to at least one exemplary embodiment, an engineered wood material may be produced by mixing a matrix material with a filler material to create a composite mixture. The composite mixer may then be pressed at a high temperature and a high pressure for a predetermined amount of time to create a solid engineered wood material.

According to another exemplary embodiment, an engineered wood material may be produced by pressing a matrix material at an elevated temperature and an elevated pressure for a predetermined amount of time to create a solid engineered wood material.

According to another exemplary embodiment, an engineered wood material may contain a matrix material and a filler material. In at least some embodiments, the engineered wood material may consist essentially of the matrix material and the filler material. In this context, to "consist essentially of" means that some additives, such as a colorant or other aesthetic additive, may be present in small amounts, but that no additional binder, adhesive, or resin is present in engineered wood material besides the matrix material and the filler material.

According to another exemplary embodiment, a matrix material may be used to create a solid material without a filler. In some cases, such a material may be referred to as a "solidified matrix material."

The present invention makes use of at least one matrix material. The matrix material of the present invention may be a bio-based material having high protein content. Further, the matrix material may also serve as a binder, such that a separate binder is not required in the engineered wood material. Because of this function, the matrix material of the present invention may also be referred to as an adhesive. The matrix material of the present invention may have a protein content of about 10 to about 75%, a lignocellulose content of about 25 to about 90%, an oil content of about 0 to about 10%, and/or a moisture content of about 3 to about 10%. Examples of matrix materials may include, but are not limited to, dried distillers grains and solubles, seed press cakes, and seed materials, such as from plants in the families of Moraceae (such as black mulberry and Osage orange), Fabaceae (such as black locust), Brassicaceae (such as camelina, pennycress, and lesquerella).

The present invention makes use of a filler material. The filler material of the present invention may be a bio-based material that provides structural properties to the engineered wood material. The filler material of the present invention may be a wood or wood product, such as wood shavings or particles. According to at least some embodiments, the filler material may be wood or wood product which has a low density and few extractables. Examples of woods which may be used in the present invention include, but are not limited to, paulownia wood, aspen wood, pine wood, basswood, Osage orange wood, cotton stems, and corn stalks.

According to at least one aspect, the present invention provides a method for producing an engineered wood material which is composed entirely of materials which are bio-based and/or renewable materials. An advantage of the present invention may be that such materials are easily and cheaply replenished, as opposed to non-bio-based materials which include petroleum-based or other non-renewable products in their manufacture.

In the present invention, the engineered wood product may be produced by pressing a matrix material, optionally mixed with a filler material, at a high temperature and a high pressure for a predetermined amount of time. The pressing may be referred to as "hot pressing." The pressing may happen in one continuous press or multiple presses. If multiple presses are used, each press may be referred to as a single instance of pressing. Further, one or multiple set temperatures may be used, and one or multiple set pressures may be used. Unless otherwise stated, the predetermined amount of time refers to the total hot press time, whether in a single press or over multiple presses. Further, optionally a "cold press" may be used before the hot pressing to prepare the material for the hot pressing. For example, a cold pressing may assist with eliminating air and densifying the material prior to hot pressing. The temperature used for hot pressing may be an elevated temperature, such as in the range of about 130-210° C., preferably in the range of about 160-190° C., and more preferably in the range of about 180-190° C. The pressure used for hot pressing may be an elevated pressure, such as in the range of about 2-6 MPa, preferably in the range of about 4-6 MPa, and more preferably in the range of about 5.5-5.8 MPa. The predetermined amount of time for the hot pressing may be any time sufficient to set the matrix and filler materials into an engineered wood material given the temperature and pressure to which the materials have been exposed. For example, the predetermined time may be in the range of about 4-15 minutes, and preferably in the range of about 10-15 minutes. Following hot pressing, the mold may be cooled under pressure to room temperature (25±2° C.), for example by using cold water circulated through the press platens.

Materials and Equipment Used in Examples

In the following Examples, different matrix and filler materials were combined to produce engineered wood products according to the present invention.

Matrix Materials.

Dried distillers grains and solubles (DDGS) were obtained as the commercial animal feed pellet product (Archers Daniels Midland Co., Decatur, Ill.). Soy protein isolate (SPI) flour (PRO-Fam 974) contained ≥90% protein was provided by Archer Daniels Midland, Decatur, Ill.). Soybeans were obtained from commercial product seed lines (United Soybean Board, Chesterfield, Mo.). Seeds of black mulberry (*Morus nigra* L., family Moraceae) (BM), Osage orange (*Maclura pomifera* (Raf.) Schneid., family Moraceae) (OO), black locust (*Robinia pseudoacacia* L., family Fabaceae) (BL), camelina (*Camelina sativa* (L.) Crantz, family Brassicaceae) (CAM), and pennycress (*Thlaspi arvense* L.) were collected from plants grown in Peoria, McLean and Tazewell Counties, Ill. Seeds of lesquerella (*Lesquerella fendleri* A. Gray (S. Wats.)) were obtained from a crop grown in Arizona. Soybeans, tree seeds, and DDGS were ground in the Wiley mill as described. To remove residual oils in soybean meal (SBM), seed meals, and DDGSs, they were extracted with hexane employing a Soxhlet extractor. DDGS and seed meals were ball ground into flours (<74 μm particles) using a laboratory bench top ball mill (Model 801CVM, U.S. Stoneware, East Palestine, Ohio) to obtain fine powder. DDGS were ground in Alumina mill jars containing Burundum cylindrical grinding media pellets (13 mm diam, ≈7.3 g wt.) (U.S. Stoneware) at a speed of 50 rpm for 60 h. DDGS and other seed flours, except CAM, were sieved through #30 to #200 meshes. CAM flour was sieved through a #40 screen to produce a flour with ≥420 μm particles. Press cakes of pennycress (PPC) and *lesquerella* (LPC) were prepared by initially milling the seeds between rollers (Model SP900-12 roller miller, Roskamp Champion, Waterloo, Iowa) with a gap set at 0.25 mm. Milled seeds were preheated in a cooker to 93° C. for 75 min, then screw pressed with a laboratory screw press (Model L-250, French Oil Mill Machinery Co., Piqua Ohio) to remove crude oil and generate press cakes. The press cakes (PPC and LPC) were then treated with hexane extraction via Soxhlet extractor, supercritical $CO_2$ extraction or Ethanol extraction. Supercritical $CO_2$ (SC—$CO_2$) extractions were performed in a modified Hewlett-Packard 7610A gas chromatograph oven (Hewlett-Packard, Avondale, Pa.) with plumbing as described by Friedrich and List (1982). The material to be extracted was placed in a 100-mL stainless steel extraction vessel (Thar Technologies, Inc., Pittsburgh, Pa.) with 30-mm diameter Whatman glass microfiber filter circles (Fisher Scientific, Waltham, Mass.) on each end. Extraction conditions were as follows: temperature was 80° C., pressure was 55.2 MPa, the solvent to feed ratio was 15:1 (g/g), and the $CO_2$ flowrate was ca. 3 L/min. The ethanol (EtOH) extractions were also performed in the modified gas chromatograph oven. The material for these extractions was placed in a 1-L stainless steel extraction vessel (Thar Technologies, Inc., Pittsburgh, Pa.) with 7.62-cm diameter Whatman paper filters (Fisher Scientific, Waltham, Mass.) and glass microfiber filters on each end. Extraction conditions were as follows: temperature was 80° C., pressure was 10.3 MPa, the S:F ratio was 5:1 (g/g), and the EtOH flow rate was ca. 10 L/min. After extraction, press cake materials were ball ground into a flour (<74 μm particles) using a laboratory bench top ball mill (Model 801CVM, U.S. Stoneware, East Palestine, Ohio). Press cakes were added to alumina mill jars containing grinding pellets (U.S. Stoneware) and ground at 50 rpm for 48 h. Press cake flours were sieved through #60 to #200 screens.

Filler Materials.

*Paulownia elongata* wood material (PW) was obtained from 3 year old trees grown in Fort Valley, Ga. Osage orange wood (OOW) shavings were obtained from 15 year old trees grown in McLean County, Ill. Wood shavings were milled successively through 4-, 2-, and then 1-mm screens with a Thomas-Wiley mill grinder, (Model 4, Thomas Scientific, Swedesboro, N.J.). Particles were then sized through a Ro-Tap™ Shaker (Model RX-29, Tyler, Mentor Ohio) employing 203 mm diameter stainless steel screen/sieves. Sieve/Screens employed were #10, #12, #30, #40, #80, #140, and #200 US Standards (Newark Wire Cloth Company, Clifton, N.J.), depending on the desired final particle size. To obtain particle separation the shaker was operated for 60 min intervals at 278 rpm. Different sieves could be used to adjust the particle size(s) used for the filler material. Table 1 shows how sieves can be correlated to PW particle sizes.

TABLE 1

Distribution Sizes of Screened PW

| Sieve (#) | Sieve Opening (μm) | Particle Size (μm) | Density (Kg/m$^3$) |
|---|---|---|---|
| 12 | 1680 | 600-1700 | 212 |
| 30 | 600 | ≥600 | 201 |
| 40 | 425 | 425-600 | 250 |
| 50 | 300 | 300-425 | 192 |
| 60 | 250 | 250-300 | 174 |
| 80 | 180 | 180-250 | 340 |
| 140 | 106 | 106-180 | 256 |
| 200 | 74 | 74-106 | 276 |
| >200 | — | ≤74 | 464 |
| ≥40 | — | ≤600 | 254 |

All materials were oven dried at 50-80° C., as needed, prior to use to achieve a moisture content of about 5-9%.

Production of Engineered Wood Material.

In an exemplary embodiment, a mixture of matrix material (DDGS or soybean- or tree seed-derivative) and filler material (PW or OOW), such as in a 50%-50% mixture, 80 g DDGS and 80 g PW, were dry mixed. Mixing can be done in a self-locking plastic bag via circular agitation for 15 minutes in a compact dryer (MODEL MCSDRY1S, Magic Chef, Chicago Ill.). Materials were then transferred to an aluminum mold (outer dimensions: 15.2 cm W×30.5 cm L×5 cm D; mold cavity: 12.7 cm W×28 cm L×5 cm D). Pressings were conducted using manual hydraulic presses (Model 4126, Carver Press Inc., Wabash, Ind.) at predetermined temperatures and pressures.

In some preparations, engineered wood panels were conditioned at 25° C. and 50% relative humidity (RH) for 48-96 hours following production.

Panel Evaluation.

Specimen board thickness was measured and test board sizes according to EN 310:1993 tests were cut to conduct three-point bending tests. Sample dimensions were 127 mm length×50 mm width×≈2.9-5.5 mm thickness, depending on the treatment. Tests were performed on a universal testing machine (Instron Model 1122 (Instron Corp., Norwood, Mass., USA) using a crosshead speed of 5 mm/min. The determination of the modulus of elasticity or flexural modulus ($E_m$) or flexural modulus according to EN 310 is given as:

$$E_m = \frac{l_1^3 (F_2 - F_1)}{4bt^3 (a_2 - a_1)}$$

The bending strength, flexural strength, or modulus of rupture ($F_m$) was calculated as:

$$F_m = \frac{3 F_{max} l_1}{2bt^2}$$

Where b is the specimen width, t is the specimen thickness, $l_1$ is the free span length, F is the force increase in the linear portion of the force-bending curve, $F_1$ being the force at 10% of the maximum load while $F_2$ is the force at 40% of the maximum load and $F_{max}$ is the force at maximum load, and $a_2$-$a_1$ is the increment of deflection at the mid-length of the test specimen. In at least some cases, $F_m$ and $E_m$ were measured directly on an Instron testing machine.

Water absorbance (WA) and thickness swelling (TS) were conducted on 50×50 mm squares immersed in water for 24 hours according to EN 317:1993. Test samples were cut into 50 mm² dimensions and immersed in distilled water for 24 hours. Thickness and weight of samples were measured before and immediately after soaking.

Example 1: Temperature Variation

Mixtures of 80 g of DDGS and 80 g of PW were used to test the effect of temperature on the properties of the engineered wood product. The 80 g of PW was a mixture of 40 g of ≤600 μm PW particles and 40 g of 600-1700 μm PW particles. Pressings were done by transferring the mixture of materials to a mold and given a cold-press (~25° C.) at 2.1 MPa for 30 seconds to eliminate air and preliminarily densify the composite materials. The mold was then transferred to a preheated press at 150, 170, 180, 185, or 190° C. Initially, molds were given 2.8 MPa pressure for 4 min and then the pressure was released in order to remove internal air build-up within the composite. Then molds were then pressed to 4.2 MPa for 4 min and pressure was released again. Finally, molds were pressed to 5.6 MPa for an additional 4 min. Total heating/compression time was ~12 min. Mold composites were then held at 5.6 MPa pressure while the heating was terminated and cooling process of the press platens commenced (via cold water). The mold was removed from the press when the mold surface reached 25±5° C. It is noted that, when experimenting with variations in the method, it was found that if the pressure is released immediately while still hot (i.e. 130-190° C.), the composite material showed internal blisters and cracks.

The composite samples obtained were tested as described above. The results are shown in FIG. 1 and in Table 2 below:

TABLE 2

Effect of press temperature on the flexural properties of DDGS-PW composites having a 50:50 ratio of matrix:filler (wt %)

| Press Temperature (° C.) | $F_m$ (MPa) | $E_m$ (MPa) |
| --- | --- | --- |
| 150 | 22.8 ± 2.0 | 3548 ± 157 |
| 170 | 25.0 ± 1.1 | 4084 ± 186 |
| 180 | 26.1 ± 1.3 | 4271 ± 68 |
| 185 | 41.4 ± 0.7 | 6073 ± 123 |
| 190 | 27.1 ± 1.0 | 5007 ± 254 |

Flexural strength ($F_m$) and Flexural modulus ($E_m$) averages ± standard errors are presented.

The bending strength ($F_m$) obtained from specimens using 150, 170 and 180° C. as the hot-press temperatures were approximately the same (FIG. 1). The DDGS-PW composites hot-pressed at 185° C. showed a significant increase in $F_m$ while the 190° C. hot-pressed specimens showed a significant decline. Likewise, the modulus of elasticity ($E_m$) values followed the same pattern (FIG. 1). Clearly, the mechanical properties of DDGS-PW composites hot-pressed at 185° C. were superior to other hot-press temperatures. This can be attributed to the optimum plasticization of the DDGS matrix at this temperature. Below this temperature (180° C.) some plasticization of DDGS occurs while above this temperature (190° C.) both plasticization and thermal degradation of the DDGS occurs. DDGS-PW composites hot-pressed at 185° C. had $F_m$ and $E_m$ values of 41.4±0.7 and 6073±123 MPa respectively; while DDGS-PW composites hot-pressed at 150° C. had $F_m$ and $E_m$ values of 22.8±2.0 and 3548±157 MPa respectively.

Example 2: Particle Size Variation

Mixtures of 80 g of DDGS and 80 g of PW were used to test the effect of PW particle size on the properties of the engineered wood product. The 80 g of PW had particle sizes of 74-1700, 74-600, 425-600, 180-250, 106-180, <74, or 600-1700 μm. DDGS-PW composites were produced as described above, except that they were subjected to 185° C. under 5.6 MPa pressure for 12 minutes.

Figure 2:
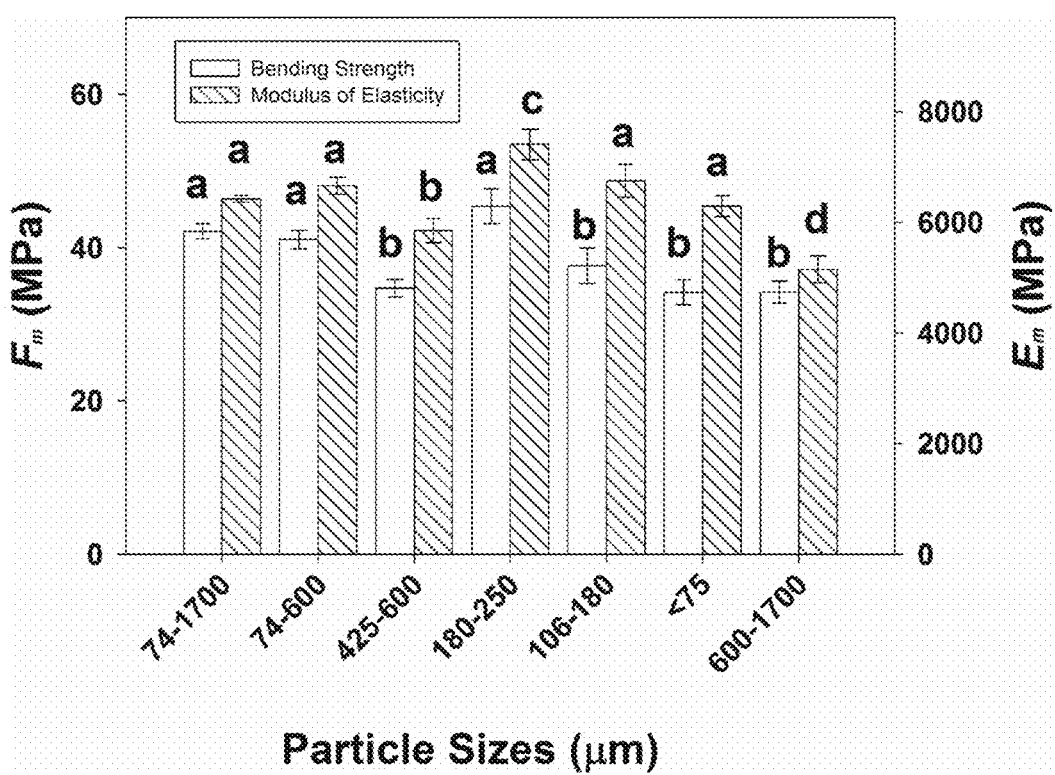
FIG. 2 shows the effect of filler particle size on the flexural properties of composite panels according to the present invention.

The composite samples obtained were tested as described above. The results are shown in FIG. 2 and in Table 3 below:

TABLE 3

Influence of particle sizes on the flexural properties of DDGS-PW composites having a 50:50 ratio of matrix:filler (wt %)

| Particle Size (μm) | $F_m$ (MPa) | $E_m$ (MPa) |
| --- | --- | --- |
| 74-1700 | 42.1 ± 1.0 | 6424 ± 63 |
| 74-600 | 41.0 ± 1.2 | 6662 ± 152 |
| 425-600 | 34.7 ± 1.1 | 5849 ± 217 |
| 180-250 | 45.4 ± 2.3 | 7409 ± 276 |
| 106-180 | 37.6 ± 2.3 | 6749 ± 296 |
| <74 | 34.2 ± 1.6 | 6292 ± 189 |
| 600-1700 | 34.2 ± 1.4 | 5151 ± 244 |

Flexural strength ($F_m$) and Flexural modulus ($E_m$) averages ± standard errors are presented.

The bending strength ($F_m$) and modulus of elasticity ($E_m$) values of DDGS-PW composites were influenced by the particle size of the wood employed. For example, composites including the largest wood particles (600-1700 μm) had the lowest flexural values when compared to the other composites tested, with $F_m$ and $E_m$ values being 34.2±1.4 and 5151±244, respectively. The next poorest composite contained the next largest particles selection (425-600 μm). Composites containing 180-250 μm particles had the highest flexural values, with $F_m$ and $E_m$ values being 45.4±2.3 and 7409±276, respectively. This suggests that this particle size was optimum for producing high quality composites. Composites that contained a mixture of wood particles composed of 74-1700 μm or 74-600 μm exhibited relatively high flexural properties that rivaled the 180-250 μm composite. Interestingly, composites containing the smallest particles (<74 μm) exhibited low $F_m$ values but had $E_m$ values on par with the other composites.

Example 3: Pressure Variation

Mixtures of 80 g of DDGS and 80 g of PW were used to test the effect of press pressure on the properties of the engineered wood product. The 80 g of PW was a mixture of 40 g of 74-600 μm PW particles and 40 g of 600-1700 μm PW particles. DDGS-PW composites were produced as described above, except that they were subjected to 185° C. for 12 minutes under pressures of 2.1, 2.8, 4.2, or 5.6 MPa.

Figure 3:
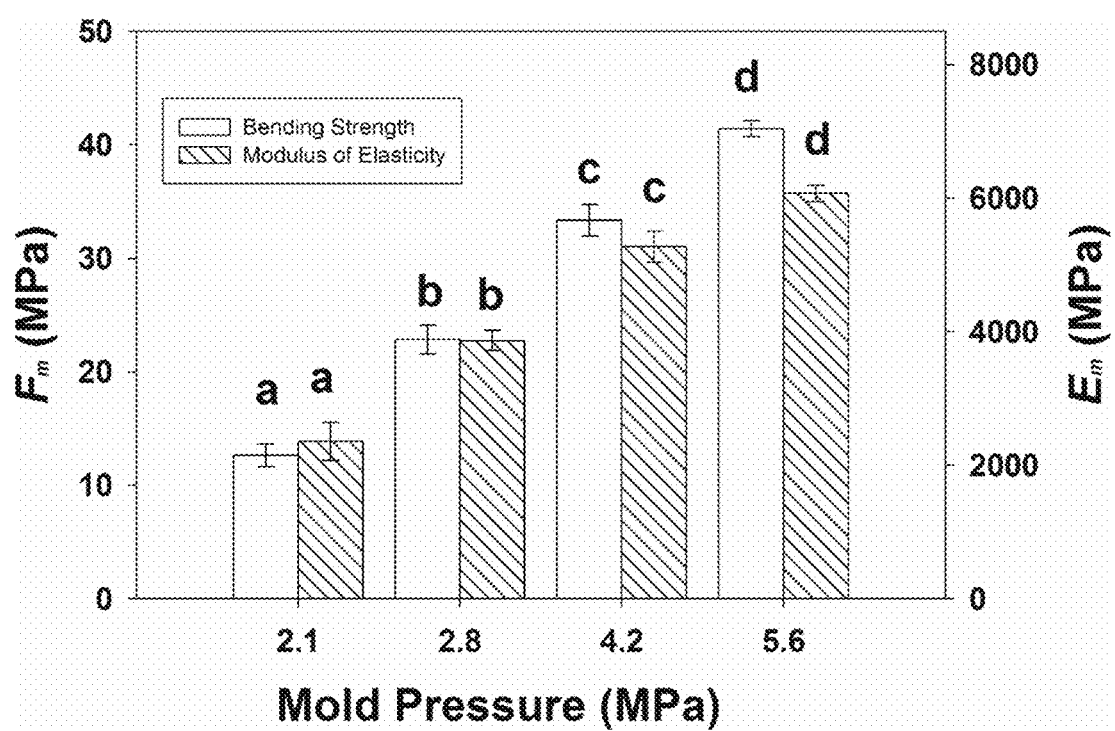
FIG. 3 shows the effect of mold pressure on the flexural properties of composite panels according to the present invention.

The composite samples obtained were tested as described above. The results are shown in FIG. 3 and in Table 4 below:

TABLE 4

Influence of pressure on the flexural properties of DDGS-PW composites having a 50:50 ratio of matrix:filler (wt %)

| Pressure (MPa) | $F_m$ (MPa) | $E_m$ (MPa) | Density (Kg/m³) |
|---|---|---|---|
| 2.1 | 12.6 ± 1.0 | 2354 ± 286 | 929 |
| 2.8 | 22.8 ± 1.3 | 3866 ± 150 | 1,052 |
| 4.2 | 33.3 ± 1.4 | 5271 ± 234 | 1,212 |
| 5.6 | 41.4 ± 0.7 | 6073 ± 123 | 1,275 |

Flexural strength ($F_m$) and Flexural modulus ($E_m$) averages ± standard errors are presented.

Best flexural properties were obtained using the highest pressure tested. Composites subjected to 5.6 MPa had $F_m$ and $E_m$ values of 41.4±0.7 and 6073±123, respectively. While composites subjected to 2.1 MPa had $F_m$ and $E_m$ values of 12.6±1.0 and 2354±286, respectively. Therefore, $F_m$ and $E_m$ values of composites given 5.6 MPa were 228% and 158% higher than $F_m$ and $E_m$ values of composites given 2.1 MPa. Applied pressure had a profound influence on the flexural properties and affected their physical properties, thickness and density. We can attribute this phenomenon to the increased densification of the DDGS-PW composite which results in an increase in the interfacial binding and thus improving the flexural properties of the composites. Density of composites treated with 2.1, 2.8, 4.2, and 5.6 MPa were 929, 1,052, 1,212, and 1,275 kg/m³, respectively. Conversely, thickness of the composites decreased when treated with 2.1, 2.8, 4.2, and 5.6 MPa, being 0.470, 0.430, 0.361, and 0.358 mm, respectively.

Example 4: DDGS Vs. Soy Flours as Matrix Material

To compare DDGS as a matrix material against soybean meal (SBM) and soy protein isolate (SPI), 15%, 25%, 50%, 75% and 100% mixtures of DDGS, SBM, or SPI were mixed with the balance of PW consisting of equal amounts of 74-600 μm PW particles and 600-1700 μm PW particles. DDGS-PW, SBM-PW, and SPI-PW composites were produced as described above, being subjected to 185° C. under 5.6 MPa pressure for 12 minutes.

Figure 4:
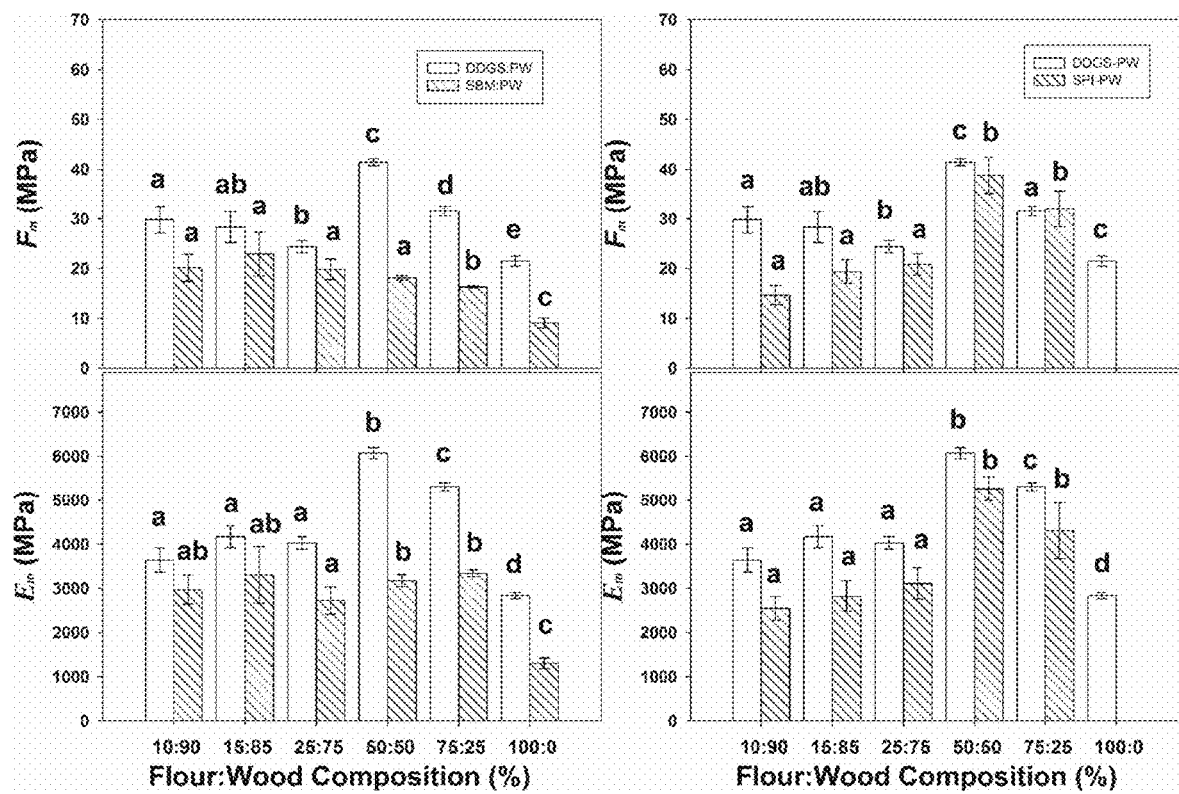
FIG. 4 shows the effect of the ratio of matrix:filler on the flexural properties of composite panels according to the present invention.

The composite samples obtained were tested as described above. The results are shown in FIG. 4 and in Table 5 below.

TABLE 5

Comparison of the flexural properties of composites using soybean and DDGS flours.

| Code* | $F_m$ (MPa) | $E_m$ (MPa) | Thickness (mm) | Density (kg/m³) |
|---|---|---|---|---|
| 10DDGS-PW | 29.8 ± 2.7 | 3640 ± 276 | 3.8 ± 0.05 | 1065 ± 24 |
| 15DDGS-PW | 28.3 ± 3.1 | 4169 ± 248 | 3.7 ± 0.03 | 1092 ± 24 |
| 25DDGS-PW | 25.4 ± 1.2 | 4027 ± 142 | 4.1 ± 0.12 | 1069 ± 46 |
| 50DDGS-PW | 41.4 ± 0.7 | 6073 ± 123 | 3.4 ± 0.24 | 1288 ± 39 |
| 75DDGS-PW | 31.5 ± 1.0 | 5309 ± 90 | 3.1 ± 0.04 | 1408 ± 14 |
| 100DDGS | 21.5 ± 1.0 | 2840 ± 73 | 2.6 ± 0.1 | 1401 ± 6 |
| 10SBM-PW | 20.1 ± 2.7 | 2969.5 ± 328 | 3.9 ± 0.07 | 1062 ± 26 |
| 15SBM-PW | 22.9 ± 4.4 | 3304.2 ± 640 | 3.8 ± 0.11 | 1082 ± 50 |
| 25SBM-PW | 18.2 ± 2.3 | 2438.2 ± 376 | 4.9 ± 0.15 | 916 ± 30 |
| 50SBM-PW | 17.8 ± 0.4 | 2965.2 ± 233 | 4.1 ± 0.04 | 1070 ± 10 |
| 75SBM-PW | 16.2 ± 0.2 | 3388.9 ± 77 | 3.6 ± 0.07 | 1157 ± 27 |
| 100SBM | 8.1 ± 1.2 | 1174.1 ± 161 | 3.4 ± 0.12 | 1199 ± 29 |
| 10SPI-PW | 14.7 ± 1.9 | 2549 ± 270 | 4.0 ± 0.03 | 1028 ± 20 |
| 15SPI-PW | 19.4 ± 2.4 | 2824 ± 347 | 3.8 ± 0.1 | 1079 ± 34 |
| 25SPI-PW | 20.8 ± 2.2 | 3110 ± 353 | 4.2 ± 0.05 | 1075 ± 38 |
| 50SPI-PW | 38.8 ± 2.2 | 5264 ± 370 | 3.7 ± 0.01 | 1219 ± 24 |
| 75SPI-PW | 32.0 ± 3.6 | 4309 ± 636 | 3.7 ± 0.17 | 1216 ± 25 |
| 100SPI** | — | — | — | |

Flexural strength ($F_m$), Flexural modulus ($E_m$), thickness, and density averages ± standard errors are presented.
*For each code, the leading number indicates the percentage of the composition which is matrix material (DDGS, SBM, or SPI). The balance of the composition in each case is PW
**Panel cracked within 24 hours after production; was not tested Neat DDGS (100%, 100DDGS) produced a panel that had the highest density and lowest thickness of all DDGS-PW composites but exhibited the lowest flexural values of all the DDGS-PW composites tested (FIG. 4). Addition of PW increased the flexural values of all the DDGS-PW composites compared to neat DDGS. The highest flexural properties were obtained from composites containing 50:50 DDGS: PW (wt %). Increasing the concentration of PW in the 10:90, 15:85 and 25:75 DDGS:PW (wt %) composites resulted in a reduction of flexural properties compared to other DDGS-PW composites (i.e., 50:50 and 75:25 wt %). For all dosage treatments tested, DDGS-PW composites had superior flexural properties compared to SBM-PW composites (FIG. 4; Table 5). The flexural properties of SPI-PW composites also compared poorly to DDGS-PW composites. For example, the $F_m$ values of 50DDGS-PW and 75DDGS-PW and 50SPI-PW and 75SPI-PW were same while the $E_m$ values for these formulations were not. Neat 100% SPI (100%) produced a panel that cracked within 24 hours after removal from the mold and therefore could not be tested. Composite formulations of 10SPI-PW, 15SPI-PW and 25SPI-PW had inferior flexural properties compared to 10DDGS-PW, 15DDGS-PW and 15DDGS-PW. Soy flours (e.g., SBM and SPI) have been employed in numerous studies to fabricate fiberboards. Clearly, the adhesive properties of DDGS are similar or superior to SBM and SPI. This observation suggests that DDGS may be substituted for soybean flour as a bio-based adhesive.

Figure 5:
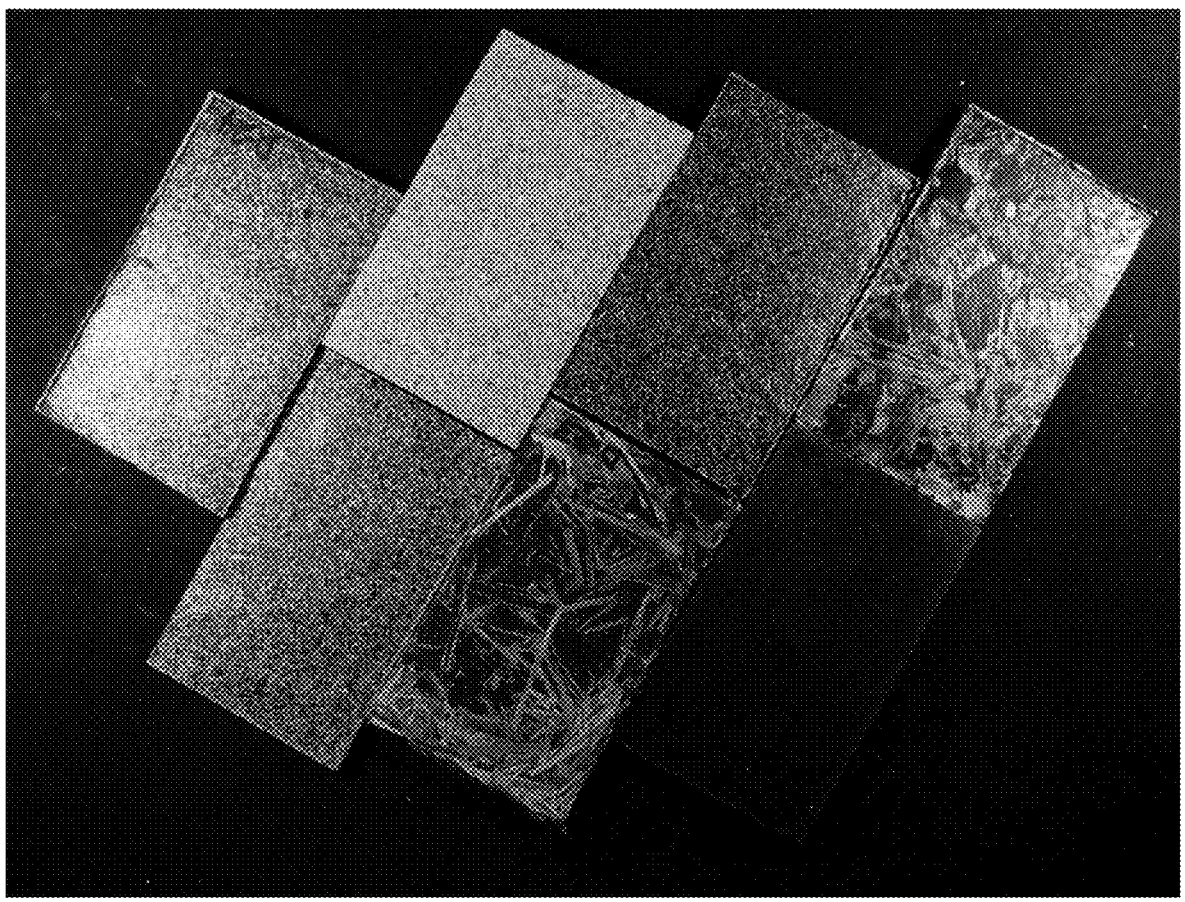
FIG. 5 shows examples of panels prepared using a ratio of matrix:filler of 50:50. Matrix materials used were DDGS and filler materials used were Osage orange wood, Paulownia wood, pine wood, cotton stems, and corn stalks.

Images showing some exemplary panels using different materials are shown in FIG. 5.

Example 5: Water Adsorption and Thickness Swelling

Figure 6:
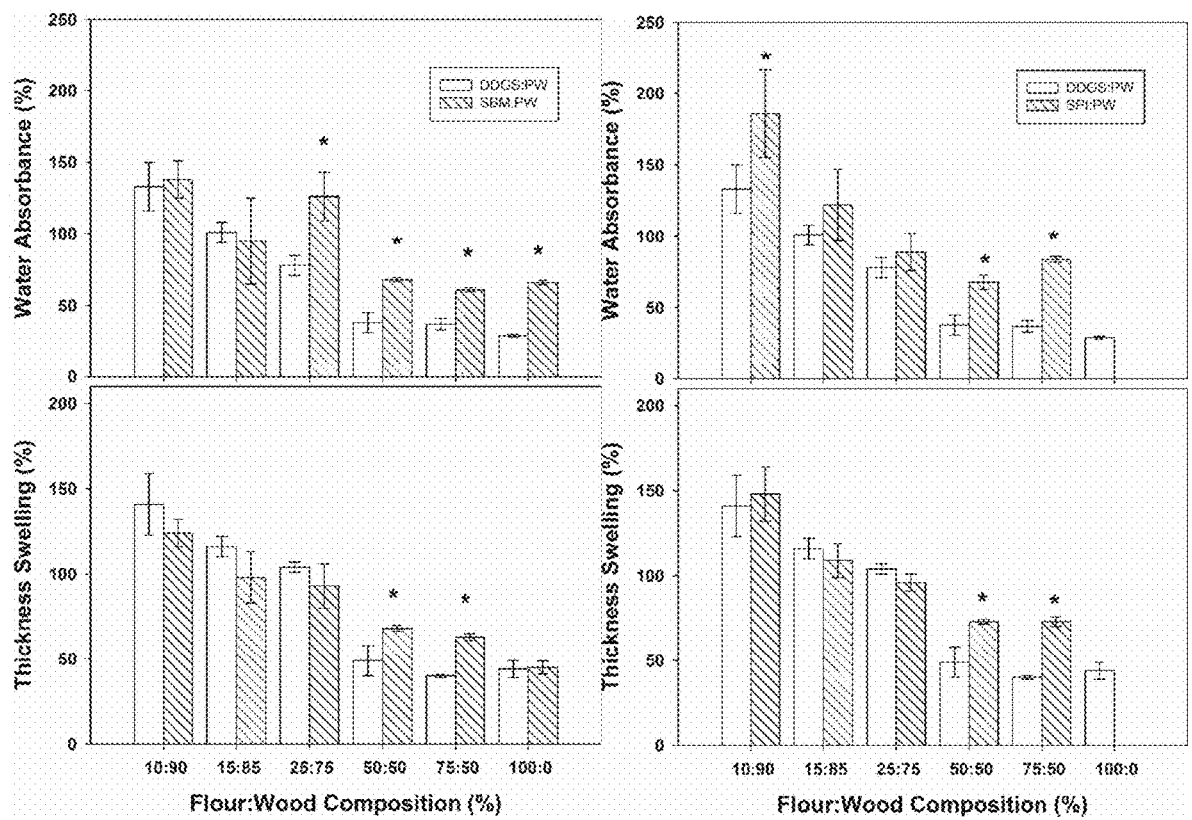
FIG. 6 shows the effect of the ratio of matrix:filler on the dimension stability (water absorbance and thickness swelling) of composite panels according to the present invention.

The same composites produced in Example 4 above were used to evaluate water absorbance and thickness swelling. The composite samples obtained were tested as described above. The results are shown in FIG. 6 and Table 6 below:

TABLE 6

Comparison of the water absorbance and thickness swelling of composites using soybean and DDGS flours.

| Code* | Water Absorbance (%) | Thickness swelling (%) |
|---|---|---|
| 10DDGS-PW | 133 ± 17 | 141 ± 18 |
| 15DDGS-PW | 101 ± 7 | 116 ± 6 |
| 25DDGS-PW | 78 ± 7 | 104 ± 3 |
| 50DDGS-PW | 38 ± 7 | 49 ± 9 |
| 75DDGS-PW | 37 ± 4 | 40 ± 1 |
| 100DDGS | 29 ± 1 | 44 ± 5 |
| 10SBM-PW | 138 ± 13 | 124 ± 8 |
| 15SBM-PW | 95 ± 30 | 98 ± 15 |
| 25SBM-PW | 126 ± 17 | 93 ± 13 |
| 50SBM-PW | 68 ± 2 | 68 ± 2 |
| 75SBM-PW | 61 ± 1 | 63 ± 2 |
| 100SBM | 66 ± 1 | 45 ± 4 |
| 10SPI-PW | 186 ± 31 | 148 ± 16 |
| 15SPI-PW | 122 ± 25 | 109 ± 10 |
| 25SPI-PW | 89 ± 13 | 96 ± 5 |
| 50SPI-PW | 68 ± 5 | 73 ± 1 |
| 75SPI-PW | 84 ± 2 | 73 ± 3 |
| 100SPI** | — | — |

Water absorbance and thickness swelling averages ± standard errors are presented.
*For each code, the leading number indicates the percentage of the composition which is matrix material (DDGS, SBM, or SPI). The balance of the composition in each case is PW
**Panel cracked within 24 hours after production; was not tested Regardless of the flour employed, as the concentration of wood flour increases, the amount of water absorbed by the composite increased proportionally. Higher matrix contents in the 50DDGS-PW and 75DDGS-PW exhibited substantially less water absorbance and thickness swelling. The bonding nature of SBM and SPI is attributed to the protein portion of the these flours. DDGS and SBM have a high carbohydrate content (≥50%) which is assumed to diminish their bonding abilities and increase their hydroscopic nature (Frihart et al., 2014. Soy Proteins as Wood Adhesives, chapter 16 from *Recent Adv. in Adhesion Sci. & Technol. in Honor of Dr. Kash Mittal*, CRC Press). Nevertheless, the composites fabricated with DDGS adhesives containing 35% protein were found to be comparable to composites formulated with SBM or SPI. This observation suggests that several components in the DDGS are contributing toward the bonding process in the composites. Thickness swelling and water absorbance properties of a composite varies with the type of raw materials (i.e., bonding agents, additives and fillers/reinforcements) employed in its manufacture. The bio-based matrices have a hygroscopic nature compared to the hydrophilic nature of synthetic adhesives derived from petroleum. Therefore composites employing bio-based matrices may absorb more water than composites employing synthetic adhesive/resins. Nevertheless, there is a use for composites bonded together with bio-based matrices provided their utilization is restricted to interior dry conditions. In this study, composites were fabricated without using additional additives that could improve their water resistance properties. It is possible to improve the ability of bio-based adhesive/resin/matrix materials to resist water absorption through the use of additives such as waxes or other coatings. Water absorbance and thickness swelling for the three different types of adhesive composites were somewhat comparable (FIG. 6; Table 6). Based on these water soaking results we can conclude that composites fabricated from DDGS adhesives showed comparable stability to composites fabricated from soy flour adhesives.

Example 6: Tree Seed Flours as Matrix Material

Composite panels were produced using an adhesive matrix (Osage orange meal (OOM), black locust meal (BLM) and black mulberry meal (BMM) mixed with a filler material of PW. SBM and SPI were also included in the experiment to measure the results against soy flours. The PW consisted of equal amounts of >600-1700 μm and ≤600 μm PW. Composite materials were produced using a mixture of 10%, 15%, 25%, 50%, 75%, and 100% matrix material with the balance being PW. OOM-PW, BLM-PW, and BBM-PW composites were produced as described above, being subjected to 185° C. under 5.6 MPa pressure for 12 minutes. In addition, the heated composite panels were cooled to 25±5° C. prior to opening the mold, as previously discussed.

A crude analysis of protein and moisture content of the matrix materials prior to mixing with the filler was conducted. The results are shown in Table 7 below:

TABLE 7

Analysis of tree seed and soybean flours

| Matrix | Protein (%) | Moisture (%) | Other (%) |
|---|---|---|---|
| OOM | 42.2 | 6.9 | 50.9 |
| BLM | 40.3 | 6.8 | 52.9 |
| BMM | 24.7 | 7.9 | 67.4 |
| SBM | 48.5 | 5.1 | 46.4 |

OOM was found to have the highest protein content (42.2%) of the seed meals while BBM the lowest (24.7%). In contrast, the soybean flours had much higher protein contents. Most studies indicate that protein content is the primary factor responsible for adhesion (Hojilla-Evangelista, 2002. Adhesive Qualities of Soybean Protein-Based Foamed Plywood Glues. J. Amer. Oil Chem. Soc. 79(11): 1145-1149, doi:10.1007/s11746-002-0618-z; Li et al., 2014. Preparation of Reinforced Soy Protein Adhesive Using Silane Coupling Agent as an Enhancer. BioResources 9(3): 5448-5460; Pervaiz and Sain, 2011. Protein Extraction From Secondary Sludge of Paper Mill Wastewater and its Utilization as a Wood Adhesive. BioResources 6(2): 961-970). Moisture content of tree meals were slightly higher than soybean meal flours but were less than that of the wood filler (i.e., 8.5% moisture content in the PW).

The flexural properties of the obtained samples, as well as the results of water absorbance and thickness swelling experiments (conducted as described above) are shown in Table 8 below:

TABLE 8

Physical and flexural properties of various composite panels employing tree seeds and soy flours

| Code* | $F_m$ (Mpa) | $E_m$ (Mpa) | Thickness (mm) | Density (kg/m³) | WA (%) | TS (%) |
|---|---|---|---|---|---|---|
| 10OOM-PW | 23.3 ± 3.2 | 2957 ± 415 | 3.9 ± 0.1 | 1046 ± 45 | 112 ± 30 | 91 ± 11 |
| 15OOM-PW | 39.9 ± 7 | 4522 ± 746 | 3.9 ± 0.1 | 1079 ± 53 | 142 ± 49 | 123 ± 39 |
| 25OOM-PW | 26.9 ± 1.4 | 3956 ± 162 | 4.5 ± 0.1 | 1002 ± 29 | 99 ± 4 | 82 ± 1 |
| 50OOM-PW | 40.3 ± 0.6 | 6084 ± 220 | 3.7 ± 0.1 | 1199 ± 28 | 48 ± 1 | 48 ± 2 |
| 75OOM-PW | 44 ± 0.8 | 6528 ± 290 | 3.5 ± 0 | 1294 ± 15 | 36 ± 1 | 37 ± 1 |
| 100OOM | 28.3 ± 1.6 | 5040 ± 115 | 3.3 ± 0 | 1325 ± 29 | 43 ± 0 | 30 ± 1 |
| 10BLM-PW | 14.6 ± 1.3 | 2565 ± 119 | 3.9 ± 0.1 | 1063 ± 17 | 104 ± 9 | 104 ± 10 |
| 15BLM-PW | 30.2 ± 3.8 | 3818 ± 376 | 3.8 ± 0.1 | 1077 ± 41 | 112 ± 13 | 91 ± 5 |
| 25BLM-PW | 27.9 ± 2 | 3654 ± 283 | 4.4 ± 0.1 | 1034 ± 30 | 119 ± 16 | 100 ± 8 |
| 50BLM-PW | 42.2 ± 1.2 | 6357 ± 190 | 3.6 ± 0 | 1267 ± 24 | 63 ± 3 | 69 ± 3 |
| 75BLM-PW | 36.2 ± 1.2 | 6115 ± 162 | 3.3 ± 0.1 | 1357 ± 17 | 70 ± 1 | 73 ± 2 |
| 100BLM | 23.9 ± 0.4 | 5123 ± 78 | 3 ± 0.1 | 1429 ± 11 | 82 ± 1 | 72 ± 2 |
| 10BMM-PW | 27.1 ± 1.5 | 3509 ± 264 | 4 ± 0 | 1038 ± 29 | 132 ± 18 | 123 ± 13 |
| 15BMM-PW | 45.3 ± 1.8 | 4732 ± 156 | 3.9 ± 0 | 1057 ± 42 | 161 ± 47 | 143 ± 28 |
| 25BMM-PW | 29.8 ± 7.2 | 4348 ± 725 | 4.5 ± 0.1 | 1021 ± 41 | 268 ± 63 | 158 ± 11 |
| 50BMM-PW | 27.2 ± 2.2 | 4509 ± 456 | 3.6 ± 0 | 1241 ± 18 | 51 ± 11 | 43 ± 4 |
| 75BMM-PW | 38.6 ± 2 | 6593 ± 364 | 3.2 ± 0.1 | 1393 ± 18 | 38 ± 1 | 47 ± 5 |
| 100BMM** | — | — | — | — | — | — |
| 10SBM-PW | 20.1 ± 2.7 | 2969 ± 329 | 3.9 ± 0.1 | 1062 ± 26 | 138 ± 13 | 124 ± 8 |
| 15SBM-PW | 22.9 ± 4.4 | 3304 ± 641 | 3.8 ± 0.1 | 1082 ± 50 | 95 ± 30 | 88 ± 15 |
| 25SBM-PW | 19.8 ± 2.1 | 2728 ± 310 | 4.9 ± 0.1 | 916 ± 30 | 126 ± 17 | 93 ± 5 |
| 50SBM-PW | 17.8 ± 0.4 | 2965 ± 234 | 4.1 ± 0 | 1070 ± 10 | 68 ± 1 | 68 ± 2 |
| 75SBM-PW | 16.2 ± 0.2 | 3389 ± 77 | 3.6 ± 0.1 | 1157 ± 27 | 61 ± 1 | 63 ± 2 |
| 100SBM | 8.1 ± 1.2 | 1174 ± 162 | 3.4 ± 0.1 | 1199 ± 29 | 66 ± 1 | 45 ± 4 |
| 10SPI-PW | 14.7 ± 1.9 | 2549 ± 269 | 4 ± 0 | 1028 ± 21 | 186 ± 31 | 148 ± 16 |
| 15SPI-PW | 19.4 ± 2.4 | 2824 ± 346 | 3.8 ± 0 | 1079 ± 30 | 122 ± 25 | 109 ± 10 |
| 25SPI-PW | 20.8 ± 2.2 | 3110 ± 353 | 4.2 ± 0 | 1075 ± 33 | 89 ± 13 | 96 ± 5 |
| 50SPI-PW | 38.8 ± 2.2 | 5263 ± 370 | 3.7 ± 0 | 1218 ± 17 | 68 ± 5 | 73 ± 1 |
| 75SPI-PW | 32 ± 3.6 | 4309 ± 635 | 3.7 ± 0.2 | 1216 ± 22 | 84 ± 2 | 73 ± 3 |

Flexural Strength ($F_m$), Flexural modulus ($E_m$), thickness, density, water absorbance (WA), and thickness swelling (TS) averages ± standard errors are presented.
*For each code, the leading number indicates the percentage of the composition which is matrix material (OOM, BLM, BMM, SBM, or SPI). The balance of the composition in each case is PW
** Panel cracked within 24 hours after production; was not tested Each tree seed meal expressed its adhesive properties somewhat differently (Table 8). 100% tree seed meal panels were noted to be quite brittle and prone to self-shattering. Panels having 100% OOM had higher $F_m$ values than 100% BLM while 100% BMM failed to hold together prior testing due to self-shattering within 24 hours after molding. Inclusion of PW with the seed meal adhesive/resin generally resulted in higher flexural properties. Generally, composite panel density increased while the thickness decreases in composites that contain more tree seed meal.

Example 7: Osage Orange Wood as Filler Material

To compare PW as a filler material against Osage orange wood (OOW), the procedures of Example 6 above were reproduced except using OOW instead of PW.

A comparison of the chemical composition of the two woods is given in Table 9 below:

TABLE 9

Chemical Composition of PW and OOW

| Component | OOW[a] Content (%) | PW[b] Content (%) |
|---|---|---|
| Cellulose | 31-36 | 46-49 |
| Lignin | 32.5-37.5 | 21-23 |
| Hemicellulose | 16-18 | 22-25 |

[a]Salem and Mohamed, 2013;
[b]El-Showk and El-Showk, 2003

As show in Table 9, cellulose, lignin, and hemicellulose contents are different between the two wood filler materials employed. PW has higher cellulose and hemicellulose content than OOW but much lower lignin levels than OOW.

The flexural properties of the obtained samples, as well as the results of water absorbance and thickness swelling experiments (conducted as described above) are shown in Table 10 below:

TABLE 10

Physical and flexural properties of various lignocellulosic panels employing OOW reinforcements. Flexural Strength ($F_m$), Flexural modulus ($E_m$), thickness, density, weight absorbance (WA), and thickness swelling (TS) averages ± standard errors are presented.

| Code* | $F_m$ (Mpa) | $E_m$ (Mpa) | Thickness (mm) | Density (kg/m³) | WA (%) | TS (%) |
|---|---|---|---|---|---|---|
| 10OOM-OOW | 5.6 ± 1 | 1144 ± 222 | 4.5 ± 0 | 920 ± 23 | 85 ± 9 | 54 ± 4 |
| 15OOM-OOW | 5.1 ± 1.1 | 970 ± 247 | 4.3 ± 0.1 | 959 ± 23 | 73 ± 5 | 45 ± 2 |
| 25OOM-OOW | 11.1 ± 1.4 | 1725 ± 227 | 4.3 ± 0 | 1025 ± 21 | 65 ± 4 | 46 ± 1 |
| 50OOM-OOW | 28.2 ± 3.4 | 4230 ± 448 | 3.7 ± 0 | 1206 ± 26 | 32 ± 5 | 32 ± 3 |

TABLE 10-continued

Physical and flexural properties of various lignocellulosic panels employing OOW reinforcements. Flexural Strength ($F_m$), Flexural modulus ($E_m$), thickness, density, weight absorbance (WA), and thickness swelling (TS) averages ± standard errors are presented.

| Code* | $F_m$ (Mpa) | $E_m$ (Mpa) | Thickness (mm) | Density (kg/m³) | WA (%) | TS (%) |
|---|---|---|---|---|---|---|
| 75OOM-OOW | 32.2 ± 0.4 | 5313 ± 232 | 3.4 ± 0 | 1305 ± 18 | 31 ± 0 | 30 ± 0 |
| 100OOM | 26.9 ± 2.9 | 5211 ± 295 | 3.3 ± 0 | 1314 ± 47 | 41 ± 0 | 32 ± 3 |
| 10BLM-OOW | 5 ± 1.5 | 917 ± 275 | 4.5 ± 0.1 | 905 ± 43 | 100 ± 16 | 61 ± 3 |
| 15BLM-OOW | 6.2 ± 0.9 | 1080 ± 272 | 4.2 ± 0 | 974 ± 26 | 95 ± 4 | 57 ± 1 |
| 25BLM-OOW | 15.2 ± 3.8 | 2022 ± 505 | 4.3 ± 0.2 | 1059 ± 43 | 77 ± 8 | 52 ± 1 |
| 50BLM-OOW | 29.5 ± 3.7 | 4064 ± 328 | 3.6 ± 0.1 | 1258 ± 16 | 62 ± 14 | 48 ± 2 |
| 75BLM-OOW | 30.8 ± 0.8 | 5936 ± 204 | 3.2 ± 0.1 | 1394 ± 19 | 59 ± 1 | 63 ± 1 |
| 100BLM | 27.8 ± 0.4 | 6462 ± 106 | 2.8 ± 0.1 | 1436 ± 11 | 93 ± 0 | 83 ± 2 |
| 10BMM-OOW | 5 ± 1 | 787 ± 155 | 4.7 ± 0.2 | 862 ± 15 | 110 ± 1 | 68 ± 1 |
| 15BMM-OOW | 6.3 ± 2 | 1082 ± 316 | 4.4 ± 0 | 937 ± 31 | 95 ± 11 | 59 ± 5 |
| 25BMM-OOW | 4.3 ± 0.8 | 623 ± 152 | 5.1 ± 0.1 | 893 ± 22 | 124 ± 13 | 63 ± 3 |
| 50BMM-OOW | 14.4 ± 2.3 | 2924 ± 414 | 4 ± 0.1 | 1132 ± 34 | 52 ± 9 | 37 ± 1 |
| 75BMM-OOW | 36.2 ± 1.8 | 5407 ± 400 | 3.2 ± 0.1 | 1388 ± 7 | 37 ± 1 | 30 ± 4 |
| 100BMM** | — | — | | | | |
| 10SBM-OOW | 3.4 ± 0.2 | 78 ± 14 | 4.4 ± 0.1 | 927 ± 7 | 90 ± 6 | 61 ± 4 |
| 15SBM-OOW | 4.4 ± 0.7 | 827 ± 140 | 4.4 ± 0 | 917 ± 31 | 85 ± 6 | 53 ± 2 |
| 15SBM-OOW | 8.5 ± 1.3 | 1369 ± 214 | 4.4 ± 0 | 929 ± 31 | 87 ± 10 | 59 ± 3 |
| 25SBM-OOW | 9.6 ± 0.7 | 1670 ± 162 | 4.3 ± 0.1 | 958 ± 24 | 73 ± 9 | 51 ± 2 |
| 50SBM-OOW | 24.9 ± 2.2 | 5964 ± 1002 | 3.3 ± 0.1 | 1230 ± 17 | 41 ± 6 | 40 ± 1 |
| 75SBM-OOW | 25 ± 0.9 | 5876 ± 309 | 3.1 ± 0.1 | 1316 ± 17 | 46 ± 1 | 49 ± 2 |
| 100SBM | 20.3 ± 1.3 | 3940 ± 283 | 2.9 ± 0 | 1408 ± 8 | 61 ± 5 | 55 ± 4 |
| 100SBM | 26.1 ± 0.7 | 5206 ± 142 | 3 ± 0.1 | 1407 ± 10 | 67 ± 11 | 57 ± 3 |
| 10SPI-OOW | 4.7 ± 0.5 | 696 ± 106 | 4.6 ± 0.1 | 898 ± 22 | 100 ± 3 | 58 ± 4 |
| 15SPI-OOW | 3.4 ± 0.1 | 903 ± 368 | 4.3 ± 0 | 954 ± 16 | 85 ± 7 | 54 ± 3 |
| 25SPI-OOW | 19.4 ± 0.9 | 2880 ± 211 | 4 ± 0 | 1023 ± 17 | 71 ± 6 | 47 ± 2 |
| 50SPI-OOW | 29.3 ± 1.4 | 4994 ± 428 | 3.6 ± 0.1 | 1188 ± 15 | 55 ± 4 | 44 ± 1 |
| 75SPI-OOW | 19.4 ± 3.6 | 3427 ± 619 | 3.6 ± 0.1 | 1153 ± 36 | 94 ± 18 | 54 ± 1 |

*For each code, the leading number indicates the percentage of the composition which is matrix material (OOM, BLM, BMM, SBM, or SPI). The balance in each case is OOW
**Panel cracked within 24 hours after production; was not tested Inclusion of PW with the seed meal adhesive/matrix generally resulted in higher flexural properties while the inclusion of OOW with the seed meal did not (Tables 8 and 10). Clearly, the type of wood filler employed has a significant impact on the resultant mechanical properties of the composite panels. A direct comparison between PW and OOW for the various compositions in Examples 6 and 7 is shown below in Table 11:

TABLE 11

Comparison of formulations containing PW versus OOW

| Matrix | $F_m$ Diff (%)* | $E_m$ Diff (%)* | WA Diff (%)* | TS Diff (%)* |
|---|---|---|---|---|
| 10OOM | 313.3 | 158.4 | 31.6 | 69.4 |
| 15OOM | 678.0 | 366.1 | 95.3 | 173.5 |
| 25OOM | 142.0 | 129.3 | 52.3 | 80.5 |
| 50OOM | 42.9 | 43.8 | 49.1 | 48.8 |
| 75OOM | 36.7 | 22.9 | 14.7 | 21.1 |
| 10BLM | 189.1 | 179.7 | 4.5 | 70.5 |
| 15BLM | 385.5 | 253.4 | 18.0 | 58.6 |
| 25BLM | 83.4 | 80.7 | 53.3 | 91.1 |
| 50BLM | 43.1 | 56.4 | 1.1 | 42.6 |
| 75BLM | 17.4 | 3.0 | 18.5 | 17.1 |
| 10BMM | 447.1 | 345.7 | 19.5 | 80.8 |
| 15BMM | 616.8 | 337.2 | 69.2 | 142.2 |
| 25BMM | 591.5 | 598.1 | 117.3 | 151.8 |
| 50BMM | 88.7 | 54.2 | −2.2 | 15.4 |
| 75BMM | 6.5 | 22.0 | 4.2 | 56.7 |
| 10SBM | 489.1 | 3724.5 | 53.4 | 101.3 |
| 15SBM | 169.3 | 141.3 | 9.4 | 49.2 |
| 25SBM | 107.7 | 63.3 | 73.2 | 82.6 |
| 50SBM | −28.5 | −50.3 | 66.3 | 71.3 |
| 75SBM | −35.5 | −42.3 | 34.2 | 30.1 |
| 10SPI | 215.0 | 266.0 | 87.0 | 157.0 |
| 15SPI | 474.6 | 212.8 | 44.4 | 101.2 |
| 25SPI | 7.6 | 8.0 | 25.4 | 106.0 |
| 50SPI | 32.5 | 5.4 | 23.5 | 64.8 |
| 75SPI | 64.7 | 25.7 | −10.8 | 35.6 |

*Percentages are PW as compared against OOW; thus positive values indicate that the PW composition had a higher value of the measurement and vice versa for negative values In practically all instances composite formulations containing PW exhibited higher $F_m$ and $E_m$ values than the same composite formulations containing OOW (Table 11).

Example 8: Camelina Seed Flour as Matrix Material

Composite panels were produced using a Camelina (CAM) adhesive matrix mixed with a filler material of PW or OOW. The filler material consisted of equal amounts of >600-1700 μm and ≤600 μm particles (either PW or OOW). Composite materials were produced using a mixture of 10%, 15%, 25%, 50%, 75% and 100% matrix material with the balance being filler material. The composites were produced as described above, being subjected to 185° C. under 5.6 MPa pressure for 12 minutes, and then cooled under pressure to 25±5° C. prior to opening the mold.

The panels produced, with thickness and density, were as shown in Table 12 below:

TABLE 12

Composition and physical properties of composite panels

| Code* | CAM-OOW-PW (wt. %) | Thickness (mm) | Density (Kg/m$^3$) |
|---|---|---|---|
| 10CAM-PW | 10-0-90 | 4.0 ± 0.05 | 983 ± 53 |
| 15CAM-PW | 15-0-85 | 4.6 ± 0.1 | 971 ± 27 |
| 25CAM-PW | 25-0-75 | 3.8 ± 0.03 | 1100 ± 26 |
| 50CAM-PW | 50-0-50 | 3.9 ± 0.06 | 1145 ± 48 |
| 75CAM-PW | 75-0-25 | 3.5 ± 0.06 | 1244 ± 59 |
| 100CAM | 100-0-0 | 2.9 ± 0.04 | 1384 ± 14 |
| 15CAM-OOW | 10-90-0 | 4.5 ± 0.04 | 899 ± 15 |
| 25CAM-OOW | 15-75-0 | 4.4 ± 0.03 | 931 ± 18 |
| 25CAM-OOW | 25-75-0 | 4.2 ± 0.02 | 945 ± 29 |
| 50CAM-OOW | 50-50-0 | 3.5 ± 0.04 | 1174 ± 35 |
| 75CAM-OOW | 75-25-0 | 3.2 ± 0.05 | 1297 ± 15 |

*For each code, the leading number indicates the percentage of the composition which is matrix material (CAM). The balance in each case is OOW As shown in Table 12, increasing the CAM concentration of the panel increases panel thickness and decreases panel density. For example, the 10CAM-PW panel exhibited a thickness of 4.0±0.05 mm and a density of 983±53 while the 100CAM panel exhibited a thickness of 2.9±0.04 mm and a density of 1384±14.

Figure 7:
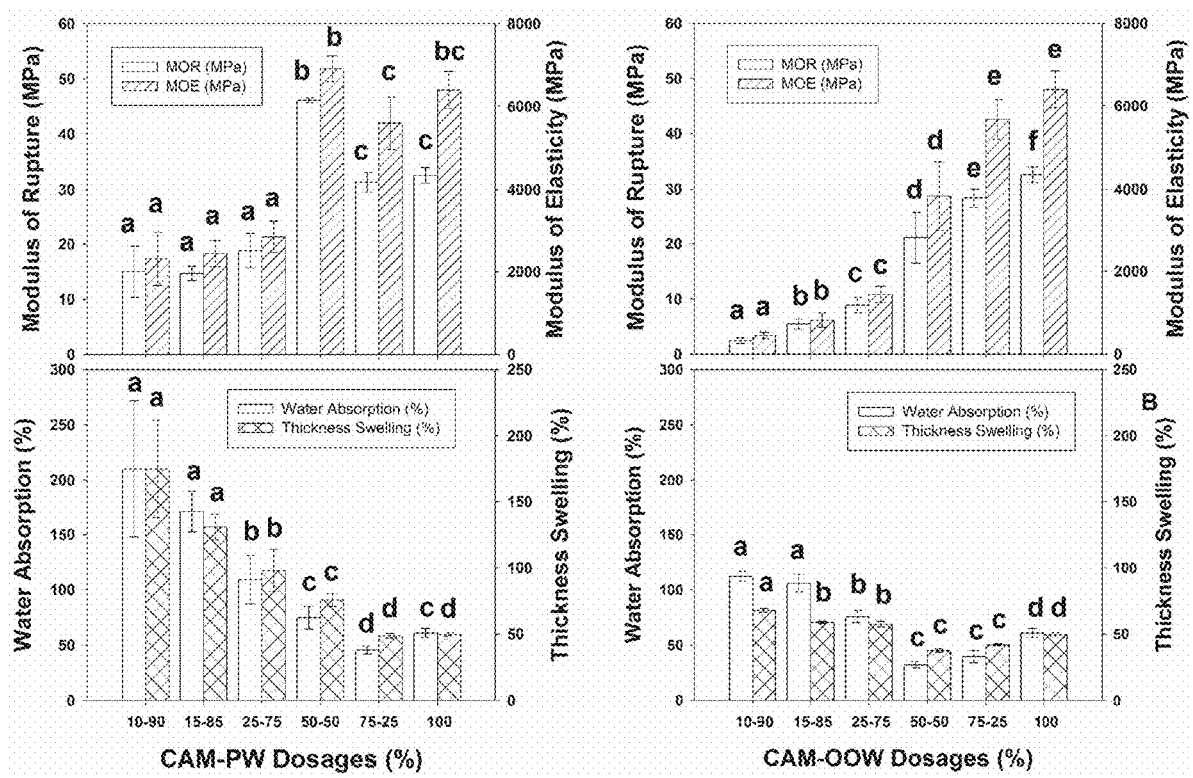
FIG. 7 shows the effect of different compositions of matrix and filler materials on the flexural and dimension stability properties of composite panels according to the present invention.

The results of flexural property tests ($F_m$ and $E_m$) for the composite panels are shown in FIG. 7. Increasing the concentration of CAM in the panel composition resulted in panels with higher densities, lower thickness and higher flexural properties. The 100CAM panel exhibited $F_m$ and $E_m$ values that were superior to the CAM-OOW composites but were inferior to the 50CAM-PW composite. The 100CAM panel resembles a composite blend similar to the CAM-wood composites since it has high concentrations of carbohydrates and proteins. The CAM composites are novel in the sense that they employ an adhesive-resin source (CAM) that has not been previously used in this manner and that they are fabricated to create a highly densified composite (899 to 1384 Kg/m$^3$) (Table 12). Increasing the concentration of wood to the range of 10CAM-PW, 15CAM-PW, or 25CAM-PW, or 10CAM-OOW, 15CAM-OOW, or 25CAM-OOW caused a significant reduction in flexural properties compared higher CAM containing composites (i.e., 50CAM-PW, 50CAM-OOW, 75CAM-PW or 75CAM-OOW). For all dosage treatments tested, CAM-PW composites had superior flexural properties compared to CAM-OWW composites (FIG. 7). It is apparent that the type of wood employed has a significant influence of their flexural properties. For example, the $F_m$ and $E_m$ values of 50CAM-PW were 46.1±0.4 and 6911±304, respectively; while the $F_m$ and $E_m$ values of 50CAM-OOW were 21.1±4.6 and 3820±836, respectively. This translates into an improvement of $F_m$ and $E_m$ values by 118 and 81%, respectively, when PW was employed verses OOW.

Also shown in FIG. 7 are the results of water absorption and thickness swelling tests. CAM-PW composites were found to exhibit greater WA and TS values than the same dosages of CAM-OOW. For example, comparing the WA and TS values of 10CAM-PW to 10CAM-OOW showed that they were 87% and 157% higher, respectively (FIG. 6). Apparently, the greater WA and TS values in CAM-PW composites can be attributed to the anatomical nature of PW which is noted to be extremely porous, low density and having large annual widths. In contrast, OOW has poor porosity, high density and small annual widths.

Example 9: Extraction Methods and Pennycress and Lesquerella Press Cakes as Matrix Material To study different extraction methods, as well as pennycress press cake (PPC) and lesquerella press cake (LPC) as matrix materials, composite panels were produced using an adhesive matrix (DDGS, LPC, PPC, with SBM or SPI to measure against soy flours) mixed with a filler material of PW. The matrix materials were treated with an extraction to remove residual oils with either ethanol (ETOH or E), super critical carbon dioxide (SC—$CO_2$ or $CO_2$), or hexane (H), as described above, or left untreated. The filler material consisted of equal amounts of >600-1700 μm and ≤600 μm PW particles. Composite materials were produced using a mixture of 50% matrix material and 50% filler material. The composites were produced as described above, being subjected to 185° C. under 5.6 MPa pressure for 12 minutes and then cooled under pressure to 25±5° C. prior to opening the mold.

A compositional analysis was performed on the matrix materials. Oil content of the untreated material was removed by hexane Soxhlet extraction. Protein content of untreated and extracted DDGS and press cake samples was derived through combustion using a Protein/Nitrogen Determinator (LEC FP-528 Model 601-500, St. Joseph, Mich.). Moisture content of the untreated and treated samples was determined using a Halogen Moisture balance/analyzer (Model HG63, Mettler-Toledo International Inc., Columbus, Ohio). The results are shown in Table 13 below, as well as calculated values for lignocellulose and protein in the final panels:

TABLE 13

Percent ingredients obtained from chemical analysis of DDGS, press cakes and soy products, either untreated or treated with ethanol (E), carbon dioxide ($CO_2$), or hexane (H)

| Matrix | Protein (%) | Moisture (%) | Oil (%) | Other (%) | Panel LC (%)* | Panel Protein (%)* |
|---|---|---|---|---|---|---|
| DDGS | 26.6 | 6.1 | 8.0 | 59.3 | 70.8 | 11.8 |
| DDGS/E | 33.1 | 5.8 | 0.0 | 61.1 | 71.6 | 14.7 |
| DDGS/$CO_2$ | 28.5 | 5.9 | 0.0 | 65.7 | 73.6 | 12.6 |
| DDGS/H | 31.2 | 5.8 | 0.0 | 63.0 | 72.4 | 13.9 |
| PCC | 29.6 | 8.2 | 8.1 | 54.1 | 68.5 | 13.2 |
| PPC/E | 35.0 | 8.1 | 0.0 | 56.9 | 69.7 | 15.6 |
| PPC/$CO_2$ | 34.0 | 8.2 | 0.0 | 57.9 | 70.2 | 15.1 |
| PPC/H | 30.1 | 8.2 | 0.0 | 61.7 | 71.9 | 13.4 |
| LPC | 28.0 | 8 | 7.2 | 56.8 | 69.7 | 12.5 |
| LPC/E | 32.6 | 8.2 | 0.0 | 59.2 | 70.8 | 14.5 |
| LPC/$CO_2$ | 32.0 | 8.1 | 0.0 | 59.9 | 71.1 | 14.2 |
| LPC/H | 31.3 | 8.2 | 0.0 | 60.5 | 71.3 | 13.9 |
| SBM | 48.5 | 5.1 | 0.0 | 46.4 | 65.1 | 21.6 |
| SPI | 89.8 | 3.2 | 0.0 | 7 | 47.6 | 39.9 |

*Values for amount of lignocellulose (LC) and protein in the panels were calculated The type of extraction method had different influence of the yields as shown in Table 14 below:

TABLE 14

Extraction yields (% weight) from DDGS, PPC and LPC using various methods

| Solvent | DDGS | PPC | LPC |
|---|---|---|---|
| SC-$CO_2$ | 7.6 | 9.5 | 10.5 |
| ETOH | 24.7 | 17.4 | 17.9 |
| Hexane | 8 | 8.1 | 7.2 |

When SC—$CO_2$ was used for the extraction, lesquerella gave the highest yield and DDGS gave the lowest yield. However, when ETOH was used, DDGS gave the highest yield while pennycress gave the lowest yield. This suggests that the lesquerella contains more non-polar material that is extracted by the non-polar SC—$CO_2$. On the other hand, the DDGS apparently contain a higher amount of polar compounds that are removed by the relatively polar ETOH.

Table 15 below shows the flexural properties of panels fabricated in this study:

TABLE 15

Mechanical Properties of Various Panel Compositions having a 50:50 ratio of matrix:filler (wt. %).

| Composition | $F_m$ (Mpa) | $E_m$ (Mpa) |
|---|---|---|
| DDGS-PW | 21.7 ± 1.9 | 3365 ± 300 |
| DDGS/E-PW | 19.9 ± 2.3 | 3087 ± 207 |
| DDGS/CO$_2$-PW | 28.9 ± 4.2 | 4228 ± 460 |
| DDGS/H-PW | 28.6 ± 2.2 | 4102 ± 427 |
| PPC-PW | 17.4 ± 1.2 | 2332 ± 95 |
| PPC/E-PW | 35.0 ± 4.1 | 4997 ± 561 |
| PPC/CO$_2$-PW | 43.3 ± 1.1 | 5601 ± 236 |
| PPC/H-PW | 44.4 ± 3.3 | 5787 ± 658 |
| LPC-PW | 40.2 ± 0.7 | 5506 ± 264 |
| LPC/E-PW | 52.6 ± 2.1 | 7109 ± 306 |
| LPC/CO$_2$-PW | 30.8 ± 3.0 | 4622 ± 480 |
| LPC/H-PW | 52.6 ± 4.4 | 6880 ± 674 |
| SPI-PW | 38.8 ± 2.2 | 5263 ± 370 |
| SBM-PW | 17.9 ± 0.5 | 2965 ± 233 |

Flexural Strength ($F_m$), and Flexural modulus ($E_m$) averages ± standard errors are presented.

The method of extraction of the matrix material can have a significant effect on the resulting panels' flexural properties. Generally, superior flexural properties were obtained from composites subjected to extraction methods than not. For example, DDGS-PW panels exhibited $F_m$ and $E_m$ values of 21.7±1.9 MPa and 3365±300 MPa, respectively, while DDGS/H-PW composite panels exhibited $F_m$ and $E_m$ values of 28.9±2.2 MPa and 4965±460 MPa, respectively. This translates in a percent increase in $F_m$ and $E_m$ values of +32% and +22%, respectively, when using the hexane extraction. For DDGS composites, no difference in flexural properties occurred comparing DDGS-PW to DDGS/E-PW while significantly higher flexural properties were obtained from DDGS/CO$_2$-PW and DDGS/H-PW composites (Table 15). This difference may be attributed to the removal of the oil content by the respective extraction methods. Hexane or supercritical fluid extraction generated a matrix material that promoted greater interfacial adhesion to the wood materials compared to other treatments.

For the pennycress composites, the untreated control (PPC-PW) exhibited the lowest flexural properties compared to the composites resulting from treated substrates (Table 15). For example, the $F_m$ and $E_m$ of PPC/E-PW, PPC/CO2-PW and PPC/H-PW composites were +101% and +114%, +149% and +140%, and +155% and +148% greater respectively than the $F_m$ and $E_m$ values of the untreated PPC-PW composite. However, similar to the situation with PW, the PPC/E-PW composite exhibited lower flexural values compared to the flexural properties exhibited by PPC/CO$_2$-PW and PPC/H-PW composites. We attribute this situation to the type of extraction method employed. Removal of oils from the agricultural by-products improves the resultant composite's performance (Table 15).

The highest $E_m$ and $F_m$ values were obtained from the LPC compared to the DDGS and PPC composites. For example, $F_m$ and $E_m$ values of LCP-PW were +85% and +163% greater than $F_m$ and $E_m$ values of DDGS-PW. This suggests that LCP has additional adhesive properties over that of the other two materials tested. The combination of the proteins with polysaccharide gums results in superior adhesive properties of LPC compared to DDGS or PPC. Subjection of LPC to ethanol and hexane extraction resulted in composites (LPC/E-PW and LPC/H-PW that had the highest flexural properties obtained in this study (Table 15). The $F_m$ and $E_m$ of LPC/E and LPC/H were +31% and +29% and +31 and +25% greater than the $F_m$ and $E_m$ values of LPC-PW composite.

Comparing $F_m$ and $E_m$ values of composites produced from a matrix of DDGS, PPC or LPC to composites of a matrix using SBM or SPI is shown in Table 15. The flexural properties of the SBM-PW composite were similar to the untreated control composites of DDGS-PW and PPC-PW. The flexural properties LPC-PW were significantly higher than the SBM-PW. Comparing the flexural properties of the hexane extracted composites (DDGS/H-PW, PPC/H-PW and LPC/H-PW) to the SBM-PW composite clearly showed their superior properties. For example, $F_m$ and $E_m$ MPa values of SBM-PW were 18.1±0.5, and 2,965±212, respectively, compared to $F_m$ and $E_m$ MPa values of DDGS/H-PW which exhibited 28.6±2.2, and 4,228±427, respectively. It should be noted that SBM contains 50% protein while the hexane extracted DDGS, PPC and LPC contained 29, 31 and 36% protein (Table 13). This suggests that protein content may not be the only factor involved in the adhesive character of these matrix materials. The SPI-PW composite which contains +90% proteins exhibited much greater flexural properties than the SBM-PW composite (Table 15). Several PPC and LPC composites (i.e., PPC/CO$_2$-PW, PPC/H-PW, LPC-PW, LPC/E-PW, and LPC/H-PW) were found to equal or exceed the SPI-PW composite in terms of flexural properties.

An important parameter to ascertain is the dimensional stability of engineered panels and compare them to panels employing recognized adhesives. The water absorption (WA) and thickness swelling (TS) of the various composites are shown in Table 16 below:

TABLE 16

Dimensional stability properties of composites having a 50:50 ratio of matrix:filler (et. %).

| Formulation | TS % | WA % | Thickness (mm) | Density (kg/m$^3$) |
|---|---|---|---|---|
| DDGS-PW | 57 ± 8 | 48 ± 5 | 3.84 ± 0.09 | 1,133 ± 65 |
| DDGS/E-PW | 83 ± 4 | 84 ± 12 | 4.24 ± 0.28 | 986 ± 280 |
| DDGS/CO2-PW | 60 ± 4 | 54 ± 4 | 3.67 ± 0.10 | 1,156 ± 39 |
| DDGS/H-PW | 42 ± 4 | 37 ± 3 | 3.55 ± 0.07 | 1,188 ± 47 |
| PPC-PW | 61 ± 4 | 51 ± 3 | 3.44 ± 0.08 | 1,256 ± 19 |
| PPC/E-PW | 61 ± 9 | 59 ± 11 | 3.67 ± 0.18 | 1,182 ± 43 |
| PPC/CO2-PW | 31 ± 3 | 30 ± 3 | 3.39 ± 0.05 | 1,290 ± 18 |
| PPC/H-PW | 29 ± 4 | 28 ± 3 | 3.28 ± 0.03 | 1,312 ± 28 |
| LPC-PW | 55 ± 4 | 45 ± 7 | 3.38 ± 0.03 | 1,296 ± 14 |
| LPC/E-PW | 56 ± 7 | 48 ± 6 | 3.50 ± 0.05 | 1,239 ± 28 |
| LPC/CO2-PW | 62 ± 4 | 81 ± 15 | 4.11 ± 0.07 | 1,088 ± 117 |
| LPC/H-PW | 44 ± 6 | 40 ± 3 | 3.35 ± 0.04 | 1,266 ± 19 |
| SPI-PW | 73 ± 4 | 68 ± 5 | 3.70 ± 0.01 | 1,201 ± 18 |
| SBM-PW | 68 ± 3 | 68 ± 1 | 4.06 ± 0.01 | 1,049 ± 13 |

Thickness swelling (TS) and water absorbance (WA), thickness, and Density averages ± standard errors are presented.

Following 24 hours of soaking composites, thickness increased from 29 to 83% while WA was measured at 28 to 84% depending on the composite composition. Generally, there was a close association between the thickness and density of the TS and WA values. However, the extraction method and matrix type were also contributing factors. For example, comparing some DDGS composites, DDGS/H-PW had a thickness of 3.55±0.10 mm and a density of 1,188±47 kg/m$^3$ exhibited TS of 42±4% and WA of 37±3% while DDGS/E-PW had a thickness of 4.28±0.28 mm and a density of 986±280 kg/m$^3$ exhibited 83±4% TS and 84±12%

WA. Interestingly, the soy flour composites, SPI-PW and SBM-PW, exhibited relatively high TS and WA compared to other composites tested. These results suggest that high protein content in these composites imbibes water which adversely affects the dimensional stability. The employment of hexane extraction was found to be the most effective treatment for the various composites to improve the mechanical, physical and dimensional stability properties (Table 16).

It should be noted that those composite panels that exhibited higher densities and were thinner also exhibited higher mechanical properties compared to composite panels that had lower densities and were thicker (Tables 15 and 16). All composite materials contained the same amount of materials and were fabricated the same manner. The matrix material and method of extraction was responsible for the physical properties of the composite panel which in turn influenced its mechanical properties. The panels employed in this study had a 50:50 mixture of matrix:filler. However, the matrix itself also contains a considerable amount of lignocellulosic material (~54-66%), thus making the composite panel have about 69-72% lignocellulose and 12-16% protein (Table 13). The lignocellulosic panels had a density between 986 to 1,256 kg/m³. Commercial panels usually contain 85-90% wood and the rest adhesives and additives. High density fiber boards (HDF) panels have a density (900-1000 kg/m³) and medium density fiberboard (MDF) have a density of (600-1000 kg/m³). HDF and MDF generally are marketed in thickness varying from 3 to 12 mm in thickness. The panels employed in this study roughly correspond in mechanical properties to high density fiber boards, though they contain less wood (filler).

Example 10: Pennycress and Lesquerella Press Cakes as Matrix Material

To study pennycress press cake (PPC) and lesquerella press cake (LPC) as matrix materials, composite panels were produced using an adhesive matrix (LPC, PPC, with SBM and SPI to measure against soy flours) mixed with a filler material of PW. The LPC and PPC were given a Soxhlet hexane extraction to remove residual oils. The filler material consisted of equal amounts of >600-1700 μm and 600 μm PW particles. Composite materials were produced using a mixture of 10%, 15%, 25%, 50%, 75% and 100% matrix material with the balance being filler material (PW). The composites were produced as described above, being subjected to 185° C. under 5.6 MPa pressure for 12 minutes, and then cooled under pressure to 25±5° C. prior to opening the mold. The composite panels in this Example were conditioned for 96 hours at 25° C. at 50% relative humidity prior to evaluation.

Analysis of the percentage of major components in the LPC and PPC press cakes was conducted by both commercial methods (Analab, Division of Agri-King Inc., Fulton, Ill.) and by the inventor. The results are shown in Table 17 below:

TABLE 17

| Percent of major components in press cakes | | |
| --- | --- | --- |
| Component | LPC | PPC |
| Moisture | 7.8 | 8.1 |
| Dry Matter | 92.2 | 92.9 |
| ADF (acid detergent fiber) | 14.7 | 26.9 |
| Lignin | 3.4 | 7.3 |
| Crude Fiber | 12.2 | 18.9 |
| Cellulose | 11.8 | 19.9 |
| Starch | 0.9 | 0.7 |
| Ash | 4.76 | 8.18 |
| Crude Protein | 29.9 | 33.2 |
| Oils | 12.0 | 11.8 |

Moisture content, dry matter, crude protein, and oils were similar for the two press cakes. Lignin, ADF, crude fiber, ash, and cellulose were decidedly different between the two press cakes. Both soy flour and soy protein isolate have been shown to have good adhesive properties due to the presence of its protein composition. For example, soy flour and soy protein isolate contain relatively high levels of protein, 50% and 90%, respectively. LPC and PPC contain less protein than soy flour products, 29.2% and 33.2% respectively.

The flexural, physical, and dimensional properties of the composite panels were also evaluated, with the results shown in Table 18 below:

TABLE 18

Mechanical, physical and dimensional stability properties of press cake composite panels. Flexural Strength ($F_m$), Flexural modulus ($E_m$), thickness, density, water adsorption (WA), and thickness swelling (TS) averages ± standard errors are presented.

| Code* | $F_m$ (MPa) | $E_m$ (MPa) | Thickness (mm) | Density (Kg/cm³) | WA (%) | TS (%) |
| --- | --- | --- | --- | --- | --- | --- |
| 10PPC-PW | 38.0 ± 6.9 | 4541 ± 778 | 4.1 ± 0.1 | 1028 ± 61 | 123 ± 28 | 98 ± 15 |
| 15PPC-PW | 30.9 ± 4.5 | 4152 ± 820 | 4.1 ± 0.1 | 1033 ± 28 | 104 ± 20 | 78 ± 8 |
| 25PPC-PW | 31.5 ± 5.3 | 4391 ± 625 | 4.3 ± 0.1 | 1018 ± 47 | 36 ± 5 | 42 ± 2 |
| 50PPC-PW | 50.6 ± 1.6 | 7232 ± 471 | 3.4 ± 0.1 | 1267 ± 20 | 32 ± 3 | 37 ± 5 |
| 75PPC-PW | 34.2 ± 3.4 | 6316 ± 651 | 3.2 ± 0.1 | 1352 ± 29 | 32 ± 13 | 37 ± 6 |
| 100PPC | 38.3 ± 6.8 | 6267 ± 905 | 2.8 ± 0.1 | 1394 ± 10 | 33 ± 0 | 30 ± 3 |
| 10LPC-PW | 34.9 ± 6.4 | 4330 ± 959 | 4.0 ± 0.1 | 1031 ± 51 | 161 ± 11 | 127 ± 7 |
| 15LPC-PW | 31.0 ± 5.6 | 4184 ± 908 | 3.9 ± 0.1 | 1079 ± 35 | 96 ± 16 | 88 ± 7 |
| 25LPC-PW | 39.1 ± 3.4 | 6168 ± 365 | 3.7 ± 0.1 | 1169 ± 19 | 61 ± 11 | 66 ± 13 |
| 50LPC-PW | 64.0 ± 2.2 | 7372 ± 356 | 3.4 ± 0.1 | 1289 ± 17 | 37 ± 3 | 49 ± 9 |
| 75LPC-PW | 61.2 ± 2.4 | 6664 ± 728 | 3.2 ± 0.1 | 1365 ± 15 | 39 ± 2 | 50 ± 3 |
| 100LPC | 38.9 ± 8.8 | 6311 ± 931 | 2.8 ± 0.1 | 1431 ± 12 | 41 ± 1 | 40 ± 4 |

*For each code, the leading number indicates the percentage of the composition which is matrix material (PPC or LPC). The balance in each case is PW $F_m$ and $E_m$ values varied for the composite panels depending on the dosage of matrix material employed. The highest $F_m$ and $E_m$ values occurred in composites containing a 50% matrix dosage combined with 50% PW (i.e., 50PPC-PW and 50LPC-PW). Composites containing 50PPC-PW exhibited $F_m$ and $E_m$ values of 50.6±1.6 and 7232±471, respectively, while 10PPC-PW exhibited $F_m$ and $E_m$ of 38±6.9 and 4541±778, respectively. Inclusion of higher dosages of press cakes resulted in panels with higher densities and decreasing thickness (Table 18). There were high correlations between density and thickness to the matrix dosages. No significant correlations occurred between $F_m$ or $E_m$ and the other parameters.

Example 11: Effect of Residual Oils in Lesquerella Press Cakes as Matrix Material Composite panels were produced using an adhesive matrix mixed with a filler material of PW. The matrix material was either lesquerella press cake which was untreated, and thus contained residual oils (LPCO) or lesquerella press cake treated with hexane Soxhlet extraction (LPC). The filler material consisted of equal amounts of >600-1700 μm and ≤600 μm PW particles. Composite materials were produced using a mixture of 10%, 15%, 25%, 50%, 75% and 100% matrix material with the balance being filler material (PW). The composites were produced as described above, being subjected to 185° C. under 5.6 MPa pressure for 12 minutes. The composite panels in this Example were conditioned for 96 hours at 25° C. at 50% relative humidity prior to evaluation.

The flexural, physical, and dimensional properties of the composite panels were also evaluated, with the results shown in Table 19 below:

TABLE 19

Mechanical, physical and dimensional stability properties of LPC and LPCO composite panels. Flexural Strength ($F_m$), Flexural modulus ($E_m$), thickness, density, water adsorption (WA), and thickness swelling (TS) averages ± standard errors are presented

| Code* | $F_m$ (MPa) | $E_m$ (MPa) | Thickness (mm) | Density (Kg/cm³) | WA (%) | TS (%) |
|---|---|---|---|---|---|---|
| 10LPC-PW | 34.9 ± 6.4 | 4330 ± 959 | 4.0 ± 0.1 | 1031 ± 51 | 161 ± 11 | 127 ± 7 |
| 15LPC-PW | 31.0 ± 5.6 | 4184 ± 908 | 3.9 ± 0.1 | 1079 ± 35 | 96 ± 16 | 88 ± 7 |
| 25LPC-PW | 39.1 ± 3.4 | 6168 ± 365 | 3.7 ± 0.1 | 1169 ± 19 | 61 ± 11 | 66 ± 13 |
| 50LPC-PW | 64.0 ± 2.2 | 7372 ± 356 | 3.4 ± 0.1 | 1289 ± 17 | 37 ± 3 | 49 ± 9 |
| 75LPC-PW | 61.2 ± 2.4 | 6664 ± 728 | 3.2 ± 0.1 | 1365 ± 15 | 39 ± 2 | 50 ± 3 |
| 100LPC | 38.9 ± 8.8 | 6311 ± 931 | 2.8 ± 0.1 | 1431 ± 12 | 41 ± 1 | 40 ± 4 |
| 10LPCO-PW | 23.6 ± 2.7 | 3379 ± 457 | 3.9 ± 0.1 | 1045 ± 35 | 122 ± 23 | 118 ± 14 |
| 15LPCO-PW | 26.3 ± 3.0 | 3499 ± 533 | 3.8 ± 0.0 | 1074 ± 36 | 111 ± 16 | 108 ± 8 |
| 25LPCO-PW | 32.6 ± 3.5 | 4061 ± 712 | 3.5 ± 0.1 | 1231 ± 36 | 50 ± 8 | 56 ± 5 |
| 50LPCO-PW | 34.3 ± 1.4 | 4224 ± 186 | 3.2 ± 0.0 | 1334 ± 12 | 32 ± 4 | 39 ± 3 |
| 75LPCO-PW | 25.5 ± 0.8 | 3724 ± 178 | 3.0 ± 0.0 | 1355 ± 7 | 27 ± 2 | 31 ± 2 |

*For each code, the leading number indicates the percentage of the composition which is matrix material (LPC or LPCO). The balance in each case is PW LPCO contains ~12% residual oil. Removal of residual oil by hexane Soxhlet extraction resulted in a composite panel that exhibited higher flexural values regardless of the dosage employed (Table 19). The beneficial influence of removal of oils was greater in composite panels that contained higher levels of matrix. For example, the 50LPC-PW panels exhibited $F_m$ and $E_m$ values that were 87% and 75% greater, respectively, than the $F_m$ and $E_m$ values for 50LPCO-PW panels. Likewise, the 15LPC-PW panels exhibited $F_m$ and $E_m$ values that were 18% and 20%, respectively, greater than 10LPCO-PW panels. It should be noted that panels containing 100LPCO could not be tested since they shattered shortly after fabrication.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An engineered wood material, consisting essentially of a matrix material and a filler material,
    wherein the matrix material is dried distillers grains and solubles (DDGS), seed press cake, a ground tree seed material, or mixtures thereof and
    wherein the filler material is wood particulate;
    wherein the matrix material is present in an amount of about 50% to about 75% of the engineered wood material by weight, and
    wherein the filler material is present in an amount of about 25% to about 50% of the engineered wood material by weight.

2. The engineered wood material of claim 1, wherein the matrix material has a protein content of about 10 to about 75%, a lignocellulose content of about 25 to about 90%, an oil content of about 0 to about 10%, and/or a moisture content of about 3 to about 10%.

3. The engineered wood material of claim 1, wherein the matrix material is at least one of a seed press cake and a ground tree seed material, and
    wherein the seed press cake or the ground tree seed material is produced from the seed of a plant, the plant being a member of one of the families of Moraceae, Fabaceae, and Brassicaceae.

4. The engineered wood material of claim 3, wherein the plant is one of black mulberry, Osage orange, black locust, camelina, pennycress, and lesquerella.

5. The engineered wood material of claim 1, wherein the wood particulate is produced from at least one of paulownia wood, aspen wood, pine wood, basswood, and Osage orange wood.

6. The engineered wood material of claim 1, wherein the engineered wood material consists essentially of the matrix material and the filler material.

7. A method of producing an engineered wood material of claim 1, comprising:
   mixing a matrix material with a filler material to create a composite mixture;
   adding the composite mixture to a mold;
   subjecting the composite mixture simultaneously to an elevated temperature and an elevated pressure for a predetermined amount of time; and
   cooling the composite mixture under pressure prior to opening the mold;
   wherein the matrix material is at least one of DDGS, a solvent-extracted seed press cake, and a tree ground seed material, and wherein the filler material is wood particulate.

8. The method of claim 7, wherein the elevated temperature is at least 130° C.

9. The method of claim 8, wherein the elevated temperature is at least 170° C.

10. The method of claim 7, wherein the elevated temperature is in the range of about 130° to about 210° C.

11. The method of claim 10, wherein the elevated temperature is in the range of about 150° to about 190° C.

12. The method of claim 7, wherein the elevated pressure is at least 2 MPa.

13. The method of claim 12, wherein the elevated pressure is at least 5 MPa.

14. The method of claim 7, wherein the elevated pressure is in the range of about 2 MPa to about 6 MPa.

15. The method of claim 14, wherein the elevated pressure is in the range of about 4 MPa to about 6 MPa.

16. The method of claim 7, wherein the predetermined time is at least 5 minutes.

17. The method of claim 7, wherein the predetermined time is in the range of about 4 to about 15 minutes.

18. The method of claim 17, wherein the predetermined time is in the range of about 10 to about 15 minutes.

19. The method of claim 7, wherein the subjecting the composite mixture simultaneously to an elevated temperature and an elevated pressure for a predetermined amount of time is accomplished by subjecting the composite mixture to an elevated temperature and pressure over a plurality of instances, and wherein the predetermined amount of time is the total time that the composite mixture is subjected to an elevated temperature and pressure over all of the plurality of instances.

20. The method of claim 7, wherein prior to opening the mold the composite mixture is cooled under pressure to a range of about 20° C. to about 30° C.

* * * * *